(12) United States Patent
Higaki et al.

(10) Patent No.: US 9,641,089 B2
(45) Date of Patent: May 2, 2017

(54) DC-DC CONVERTER

(71) Applicant: MITSUBISHI ELECTRIC CORPORATION, Chiyoda-ku (JP)

(72) Inventors: Yusuke Higaki, Chiyoda-ku (JP);
Ryota Kondo, Chiyoda-ku (JP);
Masaki Yamada, Chiyoda-ku (JP);
Yohei Tan, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/891,479

(22) PCT Filed: Dec. 5, 2013

(86) PCT No.: PCT/JP2013/082690
§ 371 (c)(1),
(2) Date: Nov. 16, 2015

(87) PCT Pub. No.: WO2015/004825
PCT Pub. Date: Jan. 15, 2015

(65) Prior Publication Data
US 2016/0087545 A1   Mar. 24, 2016

(30) Foreign Application Priority Data
Jul. 11, 2013  (JP) .................................. 2013-145066

(51) Int. Cl.
*H02M 3/335* (2006.01)
*H02J 7/00* (2006.01)
*H02M 1/00* (2006.01)

(52) U.S. Cl.
CPC ....... *H02M 3/33546* (2013.01); *H02J 7/0054* (2013.01); *H02J 7/0068* (2013.01);
(Continued)

(58) Field of Classification Search
CPC ................... H02J 7/0054; H02J 7/0068; H02J 2007/0059; H02M 2001/0009;
(Continued)

(56) References Cited

U.S. PATENT DOCUMENTS 7,638,904 B2 * 12/2009 Shoji ....................... H02M 1/34
                                                         307/154
9,065,341 B2 *  6/2015 Murakami ............ H02M 3/335
(Continued)

FOREIGN PATENT DOCUMENTS

JP      2009-055747 A    3/2009
JP      2009-177940 A    8/2009

OTHER PUBLICATIONS

International Search Report Issued Mar. 11, 2014 in PCT/JP13/82690 Filed Dec. 5, 2013.

*Primary Examiner* — Jessica Han
(74) *Attorney, Agent, or Firm* — Oblon, McClelland, Maier & Neustadt, L.L.P.

(57) ABSTRACT

A first switching circuit is connected between a transformer first winding and a DC power supply. A second switching circuit is connected between the transformer second winding and a battery. When charging the battery, a control circuit turns off an element in a second bridge circuit in the second switching circuit, and controls a phase shift amount of a first diagonal element, and a phase shift amount of a second diagonal element in the second bridge circuit, relative to a drive phase of a first reference element in a first bridge circuit in the first switching circuit. When discharging the battery, the control circuit turns off an element in the first bridge circuit and controls a phase shift amount of the second diagonal element and a phase shift amount of the first diagonal element relative to a drive phase of a second reference element in the second bridge circuit.

17 Claims, 35 Drawing Sheets

(52) U.S. Cl.
CPC ..... *H02M 3/3353* (2013.01); *H02M 3/33584* (2013.01); *H02J 2007/0059* (2013.01); *H02M 2001/0009* (2013.01); *H02M 2001/0058* (2013.01); *H02M 2001/0067* (2013.01); *Y02B 40/90* (2013.01); *Y02B 70/1491* (2013.01)

(58) Field of Classification Search
CPC . H02M 2001/0048; H02M 2001/0054; H02M 2001/0058; H02M 2001/0067; H02M 2001/0083; H02M 3/3353; H02M 3/33546; H02M 3/33553; H02M 3/33584
See application file for complete search history.

(56) References Cited

U.S. PATENT DOCUMENTS

| | | | |
|---|---|---|---|
| 9,455,641 B2* | 9/2016 | Kondo | H02M 3/33584 |
| 2009/0059622 A1 | 3/2009 | Shimada et al. | |
| 2011/0019440 A1 | 1/2011 | Shimada et al. | |
| 2011/0128759 A1 | 6/2011 | Shimada et al. | |
| 2013/0044519 A1* | 2/2013 | Teraura | H02M 3/33584 363/17 |
| 2013/0057200 A1* | 3/2013 | Potts | H02M 3/33584 320/107 |
| 2016/0204707 A1* | 7/2016 | Takahara | H02M 1/4258 363/16 |

\* cited by examiner

GATE PATTERN IN STEP-UP CHARGING

FIG. 6            CURRENT ROUTE IN PERIOD D

FIG. 7

CURRENT ROUTE IN PERIOD E

CURRENT ROUTE IN PERIOD A

GATE PATTERN IN STEP-DOWN CHARGING

FIG. 20  CURRENT ROUTE IN PERIOD I

FIG. 22  CURRENT ROUTE IN PERIOD A

FIG. 23  CURRENT ROUTE IN PERIOD B

GATE PATTERN IN STEP-DOWN DISCHARGING

GATE PATTERN IN STEP-UP DISCHARGING

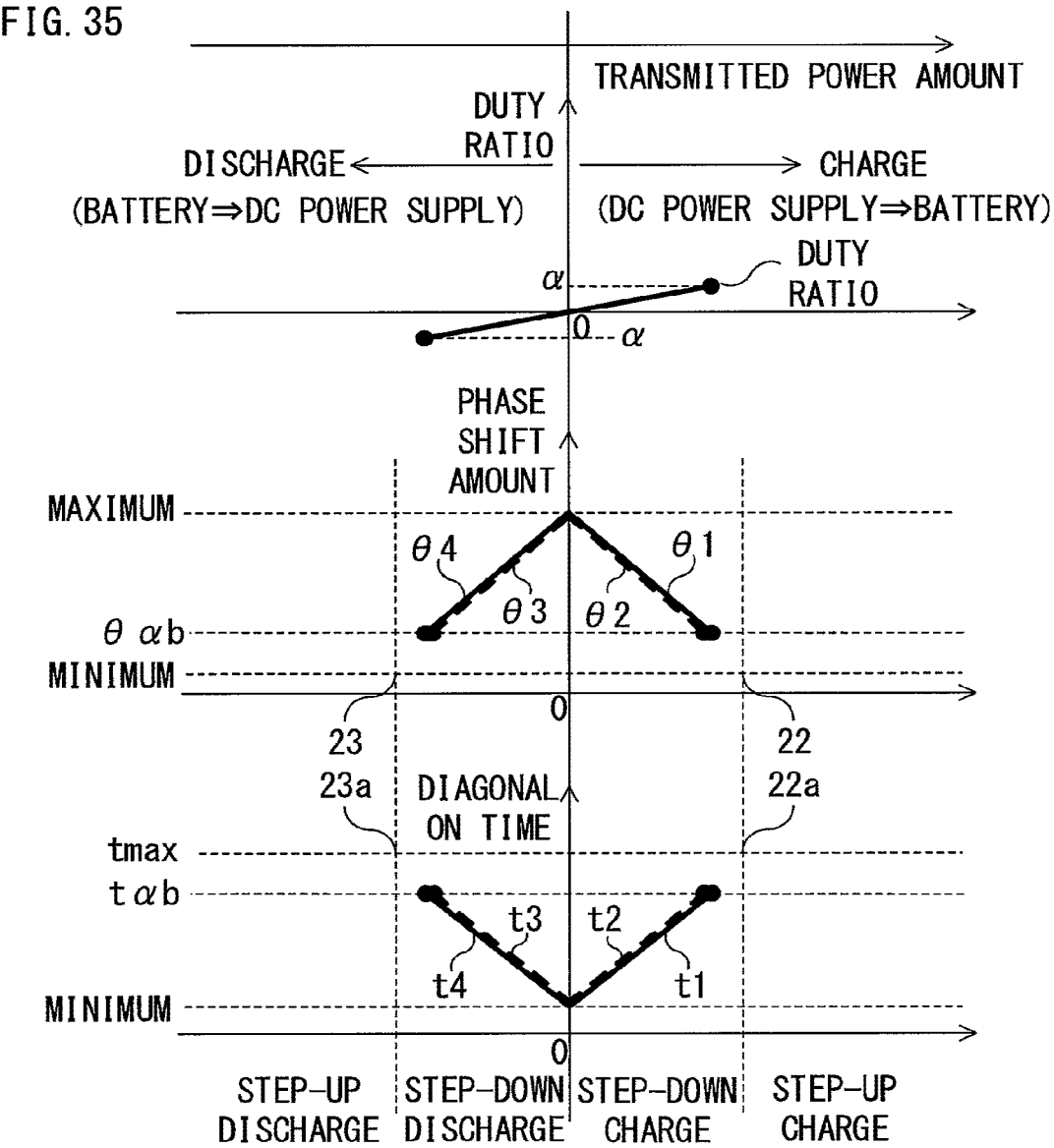

DC-DC CONVERTER

TECHNICAL FIELD

The present invention relates to a DC-DC converter having a primary side and a secondary side isolated from each other by a transformer, and particularly, a DC-DC converter capable of bidirectional power transmission between two DC power supplies.

BACKGROUND ART

A conventional bidirectional DC-DC converter includes: a first switch interposed between one end of a primary winding of a transformer and a first voltage positive terminal; a second switch interposed between the one end of the primary winding and a first voltage negative terminal; a third switch interposed between the other end of the primary winding and the first voltage positive terminal; a fourth switch interposed between the other end of the primary winding and the first voltage negative terminal; a coil; a fifth switch interposed between one end of the coil and a second voltage positive terminal; a sixth switch interposed between the one end of the coil and a second voltage negative terminal; a seventh switch interposed between one end of a secondary winding and the other end of the coil; an eighth switch interposed between the one end of the secondary winding and the second voltage negative terminal; a ninth switch interposed between the other end of the secondary winding and the other end of the coil; and a tenth switch interposed between the other end of the secondary winding and the second voltage negative terminal (see, for example, Patent Document 1).

Another example of conventional bidirectional DC-DC converter includes a transformer connecting a voltage-type full-bridge circuit connected to a first power supply and a current-type switching circuit connected to a second power supply. A snubber capacitor is connected to each switching element in the voltage-type full-bridge circuit, and a primary winding of the transformer, a resonance reactor, and a resonance capacitor are connected in series. A voltage clamp circuit composed of a switching element and a clamp capacitor is connected to the current-type switching circuit (see, for example, Patent Document 2).

CITATION LIST

Patent Document

Patent Document 1: Japanese Laid-Open Patent Publication No. 2009-177940
Patent Document 2: Japanese Laid-Open Patent Publication No. 2009-55747

SUMMARY OF THE INVENTION

Problems to be Solved by the Invention

In the bidirectional DC-DC converter as shown in Patent Document 1, switching circuits are placed on both sides of the transformer, and a step-up chopper circuit is further provided at a stage subsequent to the switching circuit on the secondary side. As for a voltage range that cannot be set by voltages on the primary side and the secondary side and a turns ratio of the transformer, the step-up chopper circuit performs step-up operation to perform adjustment to a target voltage. Therefore, there is a problem of increase in the number of components and increase in loss because of the step-up chopper circuit.

In Patent Document 2, switching loss is reduced through control using zero voltage switching. However, there is a problem that, when a power transfer direction is reversed, zero voltage switching cannot be performed and therefore switching loss increases.

In Patent Documents 1 and 2, since the primary side and the secondary side have configurations different from each other, it is impossible to merely invert the control even if a power transmission direction is reversed, and due to time delay until the control is switched, output voltage excessively increases or decreases. Thus, it is difficult to obtain stable output.

The present invention has been made to solve the above problems, and an object of the present invention is to provide a DC-DC converter capable of perform bidirectional power transmission over a wide voltage range and also realizing loss reduction, with a simple circuit configuration, without separately providing a step-up circuit. Another object of the present invention is to enable such control that swiftly follows change in a power transmission direction or sharp change in load, to perform stable output.

Solution to the Problems

A DC-DC converter according to the present invention performs bidirectional power transmission between a first DC power supply and a second DC power supply. The DC-DC converter includes: a transformer; a first converter unit composed of a full-bridge circuit having two bridge circuits each having a plurality of semiconductor switching elements to each of which an antiparallel diode and a parallel capacitor are connected, the first converter unit being connected between the first DC power supply and a first winding of the transformer, and performing bidirectional power conversion between DC and AC; a second converter unit composed of a full-bridge circuit having two bridge circuits each having a plurality of semiconductor switching elements to each of which an antiparallel diode and a parallel capacitor are connected, the second converter unit being connected between the second DC power supply and a second winding of the transformer, and performing bidirectional power conversion between DC and AC; a first reactor and a second reactor connected on respective AC input/output lines of the first converter unit and the second converter unit; and a control circuit for drive-controlling each semiconductor switching element in the first converter unit and the second converter unit, thereby controlling the first converter unit and the second converter unit. In first power transmission from the first DC power supply to the second DC power supply, the control circuit turns off all the semiconductor switching elements of a second bridge circuit which is one of the bridge circuits of the second converter unit, controls each semiconductor switching element in the first converter unit so as to perform zero voltage switching, using the first reactor, and when voltage of the second DC power supply is higher than voltage generated on the second winding of the transformer, controls the second converter unit so as to perform step-up operation, using the second reactor. In second power transmission from the second DC power supply to the first DC power supply, the control circuit turns off all the semiconductor switching elements of a first bridge circuit which is one of the bridge circuits of the first converter unit, controls each semiconductor switching element in the second converter unit so as to perform zero voltage switching, using the second reactor, and when voltage of the first DC power supply is higher than voltage generated on the first winding of the transformer, controls the first converter unit so as to perform step-up operation, using the first reactor.

Effect of the Invention

The above DC-DC converter can perform bidirectional power transmission over a wide voltage range, with a simple circuit configuration. In addition, zero voltage switching can be performed irrespective of a power transmission direction, and loss reduction can be realized owing to decrease in the number of components.

The above DC-DC converter has a circuit configuration symmetric between both sides of the transformer, thereby enabling bidirectional power transmission through simple control, and prevents reverse flow of transformer current, thereby realizing further loss reduction and size reduction of the transformer.

BRIEF DESCRIPTION OF THE DRAWINGS

FIG. 7 is a current route diagram for explaining step-up charging operation of the battery charge/discharge device according to embodiment 1 of the present invention.

FIG. 35 is a waveform diagram for explaining control operation of a battery charge/discharge device according to embodiment 4 of the present invention.

DESCRIPTION OF EMBODIMENTS

Embodiment 1

Hereinafter, embodiment 1 of the present invention will be described.

Figure 1:
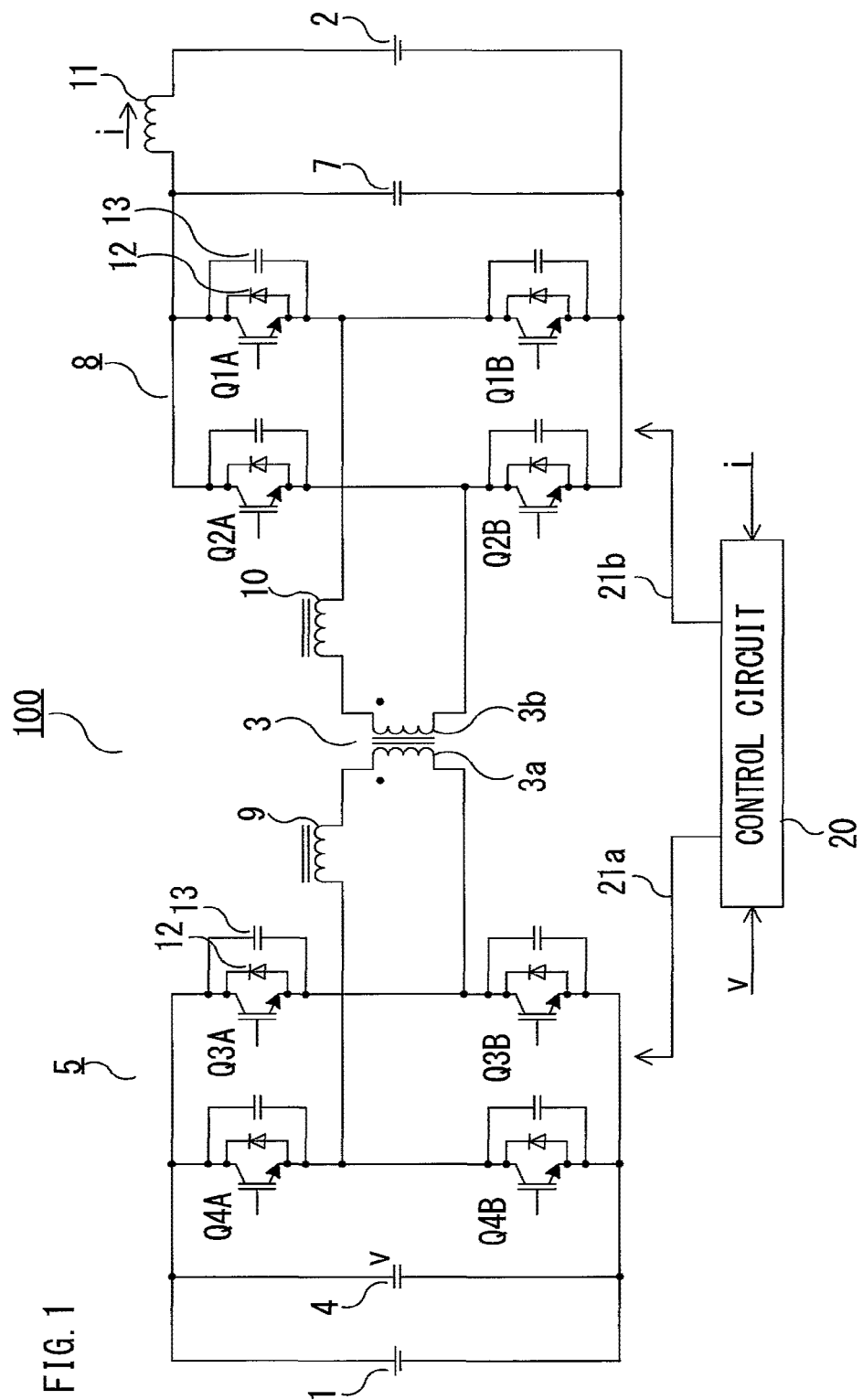
FIG. 1 is a circuit configuration of a battery charge/discharge device according to embodiment 1 of the present invention.

FIG. 1 is a diagram showing a circuit configuration of a battery charge/discharge device 100 as a DC-DC converter according to embodiment 1 of the present invention. As shown in FIG. 1, the battery charge/discharge device 100 performs bidirectional power conversion between a DC power supply 1 as a first DC power supply and a battery 2 as a second DC power supply, to charge and discharge the battery 2.

The battery charge/discharge device 100 includes: a high-frequency transformer 3 (hereinafter, simply referred to as a transformer 3) as an isolation transformer; a first smoothing capacitor 4 connected in parallel to the DC power supply 1; a first switching circuit 5 as a first converter unit; a second smoothing capacitor 7 connected in parallel to the battery 2; a second switching circuit 8 as a second converter unit; a first reactor 9 connected on an AC input/output line of the first switching circuit 5; and a second reactor 10 connected on an AC input/output line of the second switching circuit 8. In addition, the battery charge/discharge device 100 includes a control circuit 20 for controlling the first switching circuit 5 and the second switching circuit 8.

The first switching circuit 5 is a full-bridge circuit including a plurality of semiconductor switching elements Q4A, Q4B, Q3A, and Q3B (hereinafter, simply referred to as Q4A, Q4B, Q3A, and Q3B, or semiconductor switching elements Q) each composed of, for example, an IGBT or a MOSFET to which a diode 12 is connected in antiparallel. A DC side of the first switching circuit 5 is connected to the first smoothing capacitor 4, and an AC side thereof is connected to a first winding 3a of the transformer 3, to perform bidirectional power conversion between DC and AC. The first switching circuit 5 is also a zero voltage switching circuit that allows voltage between both ends of each semiconductor switching element Q at the time of its switching to be almost zero voltage, and a capacitor 13 is connected in parallel to each semiconductor switching element Q. The first reactor 9 is connected on the AC input/output line between the semiconductor switching elements Q and the transformer 3, and the first reactor 9 and the first winding 3a are connected in series.

The second switching circuit 8 is a full-bridge circuit including a plurality of semiconductor switching elements Q2A, Q2B, Q1A, and Q1B (hereinafter, simply referred to as Q2A, Q2B, Q1A, and Q1B, or semiconductor switching elements Q) each composed of, for example, an IGBT or a MOSFET to which a diode 12 is connected in antiparallel. A DC side of the second switching circuit 8 is connected to the second smoothing capacitor 7, and an AC side thereof is connected to a second winding 3b of the transformer 3, to perform bidirectional power conversion between DC and AC. The second switching circuit 8 is also a zero voltage switching circuit that allows voltage between both ends of each semiconductor switching element Q at the time of its switching to be almost zero voltage, and a capacitor 13 is connected in parallel to each semiconductor switching element Q. The second reactor 10 is connected on the AC input/output line between the semiconductor switching elements Q and the transformer 3, and the second reactor 10 and the second winding 3b are connected in series. A reactor 11 is connected to a DC side of the second switching circuit 8.

Between the second smoothing capacitor 7 and the battery 2, a current sensor (not shown) is provided for detecting current flowing through the reactor 11, as charge current i (an arrow direction is a positive direction) of the battery 2, and the sensed output therefrom is inputted to the control circuit 20. A voltage sensor (not shown) is provided for detecting voltage v of the first smoothing capacitor 4, and the sensed output therefrom is inputted to the control circuit 20. The control circuit 20 generates drive signals 21a and 21b for performing switching control for each semiconductor switching element Q in the first switching circuit 5 and the second switching circuit 8, based on the inputted values of current i and voltage v, thereby performing drive control of the first switching circuit 5 and the second switching circuit 8.

The current sensor for detecting the charge current i of the battery 2 may be located to the second switching circuit 8 side with respect to the second smoothing capacitor 7.

Next, operation of the battery charge/discharge device 100 will be described below.

Figure 2:
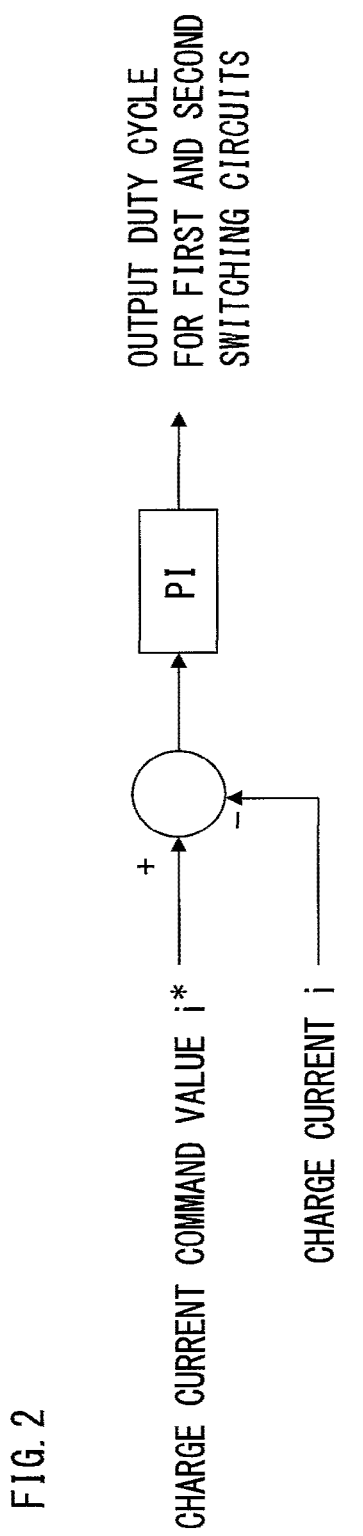
FIG. 2 is a control block diagram when the battery charge/discharge device is charged, according to embodiment 1 of the present invention.

FIG. 2 is a control block diagram in the case of transmitting power from the DC power supply 1 to the battery 2, that is, charging the battery 2. The charge current i which is output current of the battery charge/discharge device 100 is detected and inputted to the control circuit 20. As shown in FIG. 2, in the control circuit 20, the inputted charge current i is compared with a charge current command value i*, a difference therebetween is fed back to determine an output DUTY ratio (hereinafter, simply referred to as a DUTY ratio) for the first switching circuit 5 and the second switching circuit 8, and the drive signals 21a and 21b for the semiconductor switching elements Q are determined.

The first smoothing capacitor 4 connected in parallel to the DC power supply 1 has the same DC voltage as that of the DC power supply 1.

Figure 3:
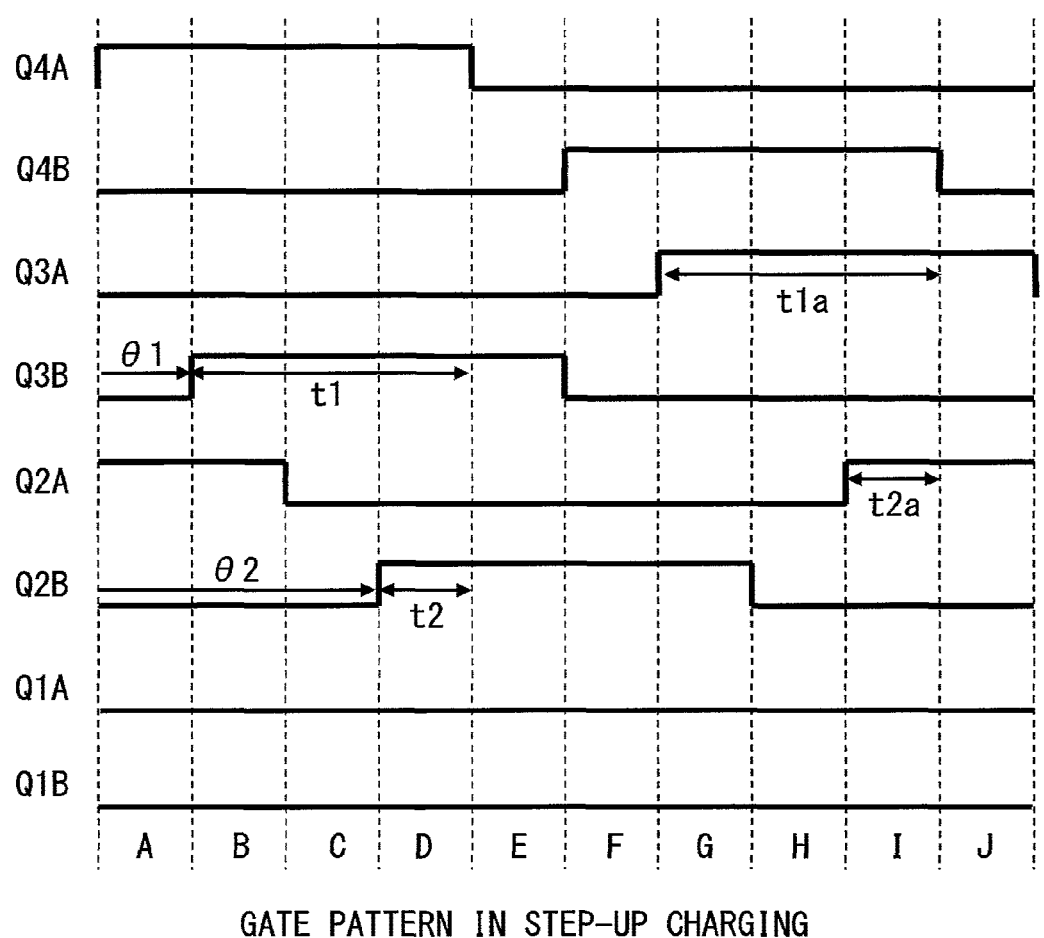
FIG. 3 is a drive signal waveform diagram in the case of step-up charging of the battery charge/discharge device according to embodiment 1 of the present invention.

FIG. 3 is a diagram showing waveforms of the drive signals 21a and 21b for the semiconductor switching elements Q in the first switching circuit 5 and the second switching circuit 8 in the case of step-up charging of the battery charge/discharge device 100. In this case, periods A to J are provided and shown for respective plural gate patterns which are combination patterns of the drive signals. In FIG. 3, for convenience sake, the drive signals for Q4A, Q4B, Q3A, Q3B, Q2A, Q2B, Q1A, and Q1B are denoted by the reference characters of the respective elements.

In this case, all the drive signals are generated based on, as reference, a first bridge circuit (Q4A, Q4B) which is one of bridge circuits in the first switching circuit 5. Q1A and Q1B in a second bridge circuit (Q1A, Q1B) which is one of bridge circuits in the second switching circuit 8 are kept in off states.

Regarding three bridge circuits other than the second bridge circuit (Q1A, Q1B), Q4A, Q3A, Q2A on a positive side (high voltage side) and Q4B, Q3B, Q2B on a negative side (low voltage side) which compose the respective bridge circuits are each controlled with an ON time ratio of 50% excluding a short-circuit prevention time. The short-circuit prevention time is a time set for preventing the semiconductor switching element on the positive side and the semiconductor switching element on the negative side from becoming ON simultaneously, and thus, after the set short-circuit prevention time has elapsed since one semiconductor switching element is turned off, the other semiconductor switching element is turned on. In this case, in order that each semiconductor switching element Q in the first switching circuit 5 on a power transmitting side performs zero voltage switching, setting is made so that, during the short-circuit prevention time, voltage of the capacitor 13 connected in parallel to each semiconductor switching element Q increases to voltage of the first smoothing capacitor 4 or decreases to the vicinity of zero voltage.

Q4A in the first bridge circuit (Q4A, Q4B) is set as a first reference element, Q1A in the second bridge circuit (Q1A, Q1B) is set as a second reference element, Q3B which is diagonal to the first reference element Q4A is set as a first diagonal element, and Q2B which is diagonal to the second reference element Q1A is set as a second diagonal element.

A phase shift amount θ1 (first phase shift amount) of the drive signal for the first diagonal element Q3B relative to a phase of the drive signal for the first reference element Q4A, and a phase shift amount θ2 (second phase shift amount) of the drive signal for the second diagonal element Q2B relative to a phase of the drive signal for the first reference element Q4A, are determined in accordance with a DUTY ratio which is a control command. That is, the phase shift amounts θ1 and θ2 are controlled in accordance with the DUTY ratio. Although the details of the control of the phase shift amounts θ1 and θ2 will be described later, in this case, the phase shift amount θ1 is kept to be minimum, and the phase shift amount θ2 varies in accordance with the DUTY ratio.

As shown in FIG. 3, in the case where a period during which the first reference element Q4A and the first diagonal element Q3B are simultaneously ON is defined as a diagonal ON time t1, the diagonal ON time t1 is determined depending on the phase shift amount θ1. A diagonal ON time t1a during which Q4B and Q3A are simultaneously ON is also equal to the diagonal ON time t1.

For the second bridge circuit (Q1A, Q1B), drive signals equal to the drive signals for the first bridge circuit (Q4A, Q4B) are assumed as virtual drive signals, and a period during which a virtual ON period of Q1A due to the virtual drive signal for the second reference element Q1A and an ON period of the second diagonal element Q2B overlap each other is defined as a virtual diagonal ON time t2. The virtual diagonal ON time t2 is determined depending on the phase shift amount θ2 of the drive signal for the second diagonal element Q2B relative to a phase of the drive signal for the first reference element Q4A. A virtual diagonal ON time t2a during which a virtual ON period of Q1B due to the virtual drive signal for Q1B and an ON period of Q2A overlap each other is also equal to the virtual diagonal ON time t2.

FIG. 4 to FIG. 13 show current routes according to the respective gate patterns shown in FIG. 3. FIG. 4 to FIG. 13 respectively correspond to the periods B to J and the period A in FIG. 3, in this order.

Hereinafter, based on FIG. 3 and FIG. 4 to FIG. 13, operation of the battery charge/discharge device 100 in one cycle will be described. It is noted that voltage of the battery 2 is higher than voltage generated on the second winding 3b, and power is transmitted from the DC power supply 1 to the battery 2.

For convenience sake, the description starts from the period B.

Figure 4:
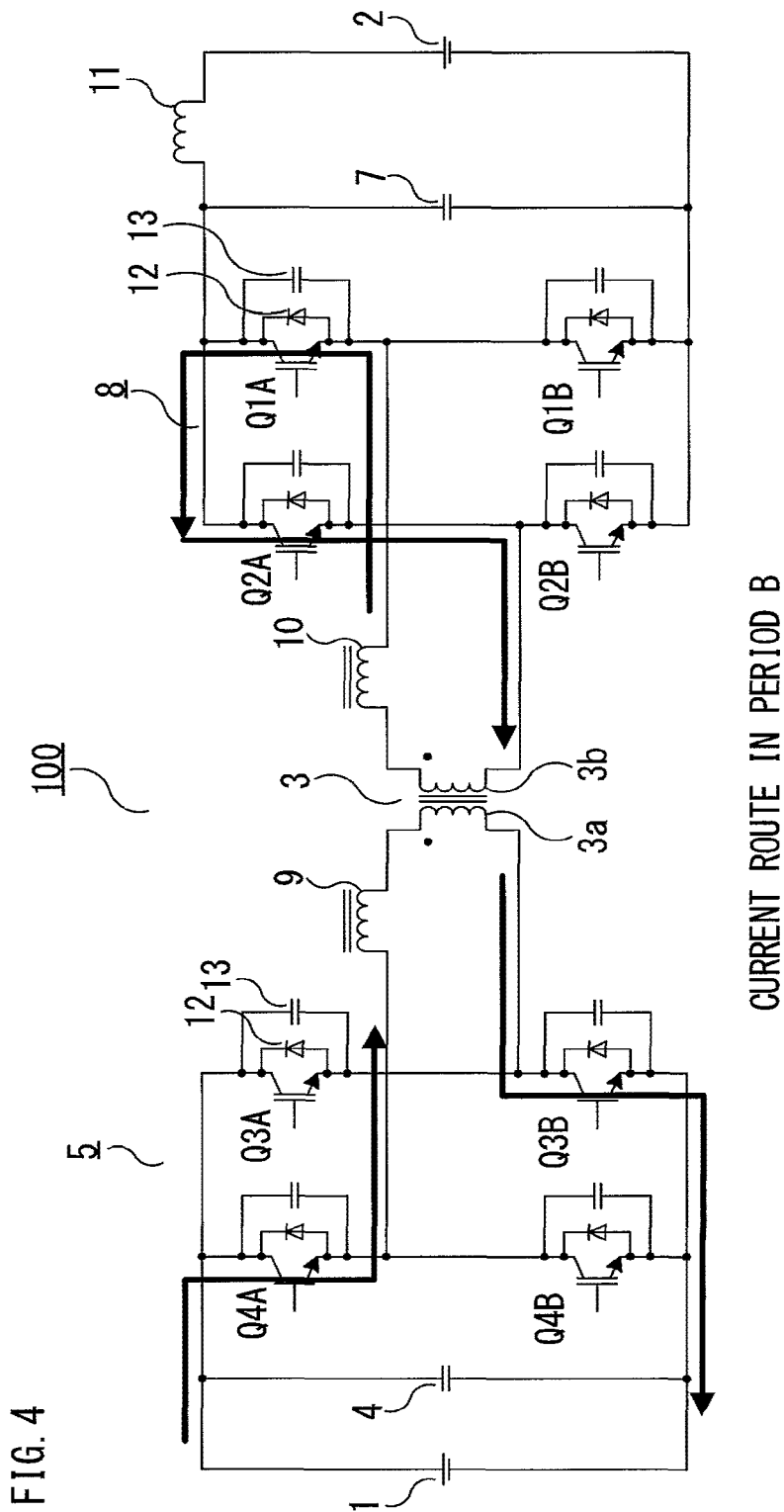
FIG. 4 is a current route diagram for explaining step-up charging operation of the battery charge/discharge device according to embodiment 1 of the present invention.

In the period B, in the first switching circuit 5, since Q4A and Q3B are ON and thus two diagonal elements become conductive, energy is transmitted from the DC power supply 1 side via Q4A and Q3B. The polarity of current is inverted from that in the period J and the period A which will be described later. In second switching circuit 8, since Q2A is ON, current circulates via the diode of Q1A, and Q2A. Therefore, the period B is a period during which the first reactor 9 and the second reactor 10 are excited (FIG. 4).

Figure 5:
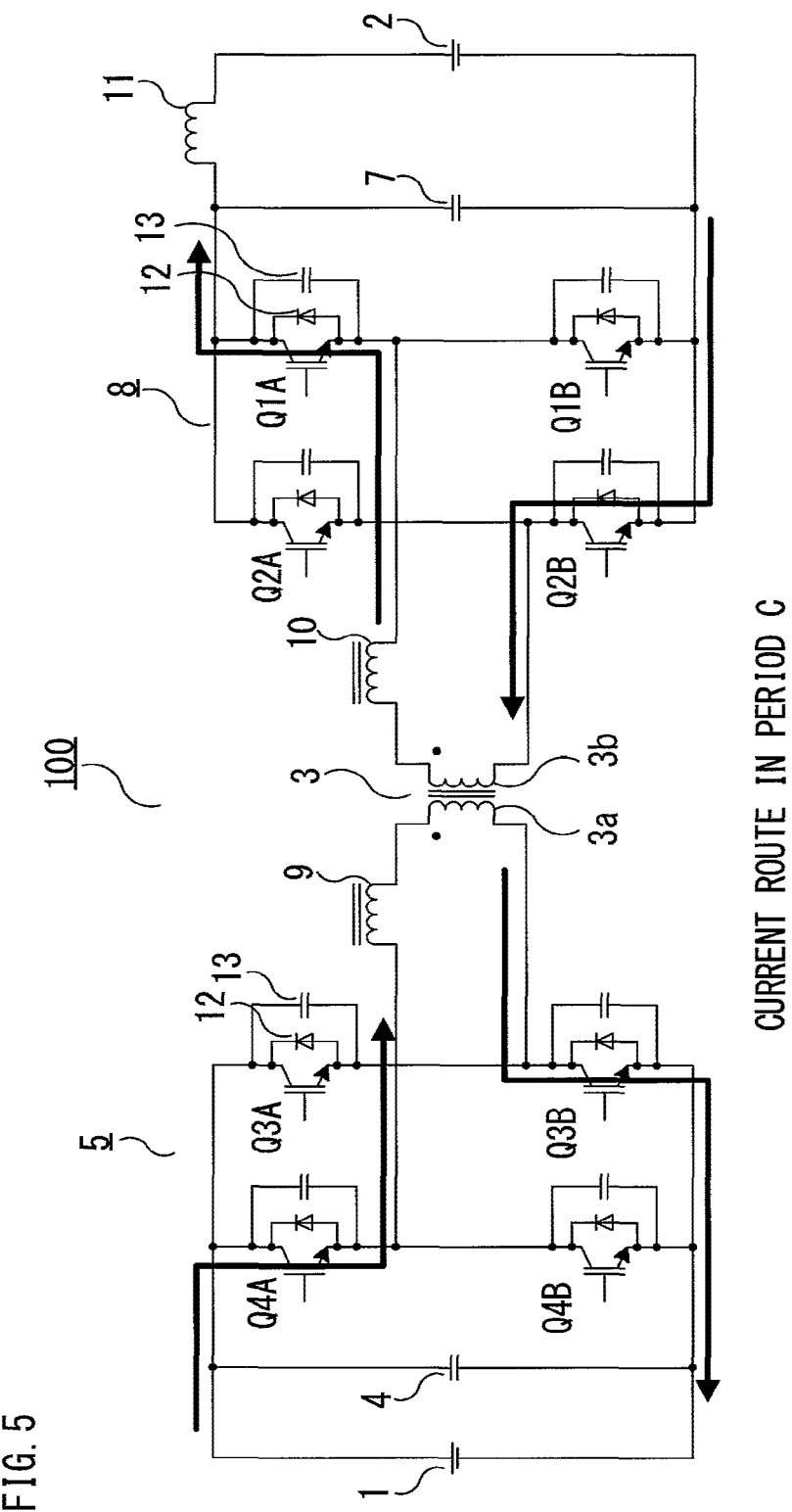
FIG. 5 is a current route diagram for explaining step-up charging operation of the battery charge/discharge device according to embodiment 1 of the present invention.

In the period C, in the first switching circuit 5, since Q4A and Q3B are ON and thus two diagonal elements become conductive, energy is transmitted from the DC power supply 1 side. In the second switching circuit 8, Q2A becomes OFF, current flows from the diode of Q1A via the diode of Q2B, and power is transmitted to the battery 2 side. Therefore, the period C is a period during which excitation energy of the first reactor 9 and the second reactor 10 is transmitted to the battery 2 side (FIG. 5).

Figure 6:
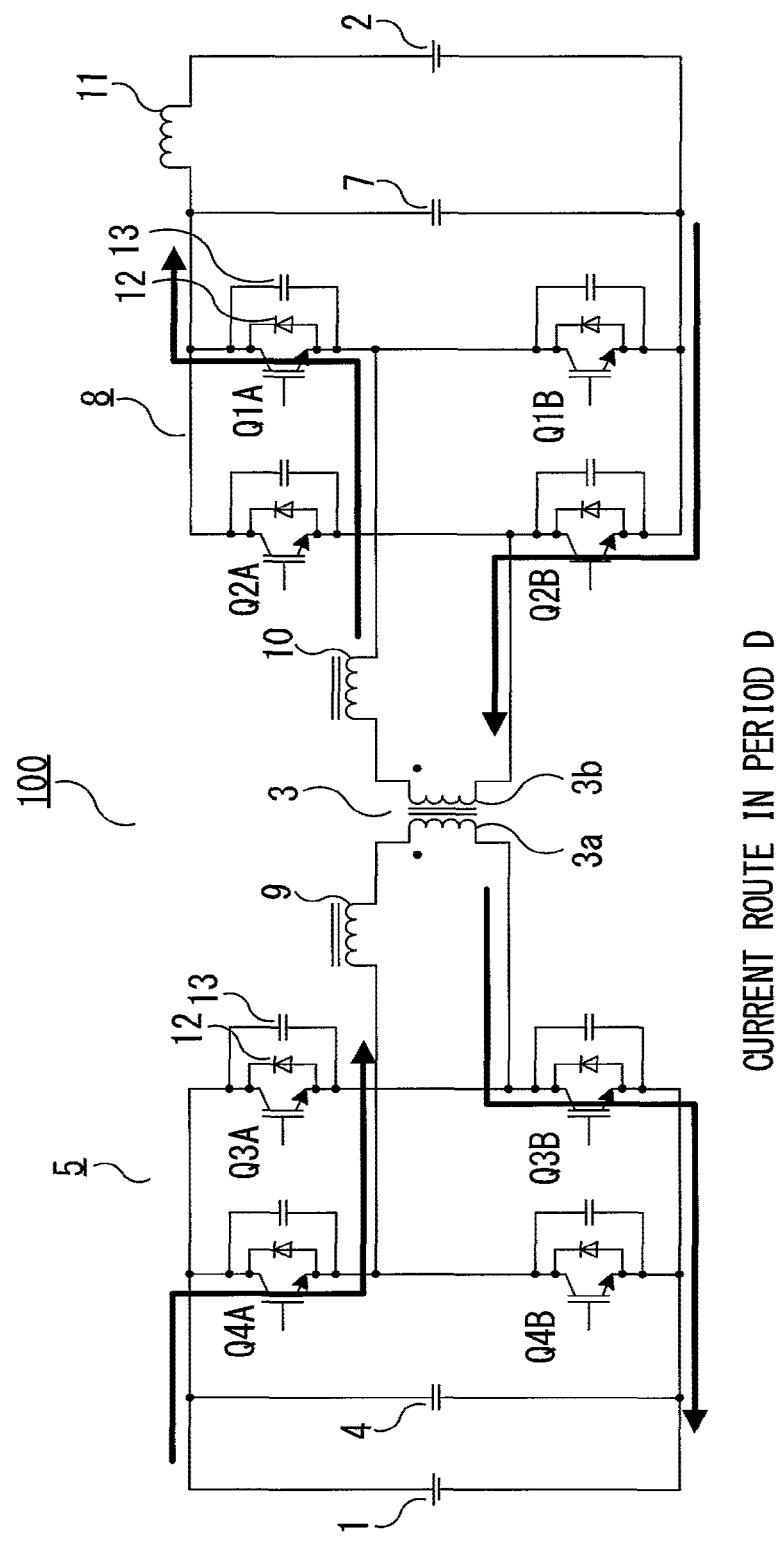
FIG. 6 is a current route diagram for explaining step-up charging operation of the battery charge/discharge device according to embodiment 1 of the present invention.

In the period D, in the first switching circuit 5, since Q4A and Q3B are ON and thus two diagonal elements become conductive, energy is transmitted from the DC power supply 1 side. In the second switching circuit 8, Q2B becomes ON, current flows from the diode of Q1A via Q2B or the diode of Q2B, and power is transmitted to the battery 2 side. Therefore, the period D is a period during which excitation energy of the first reactor 9 and the second reactor 10 is transmitted to the battery 2 side (FIG. 6).

Figure 7:
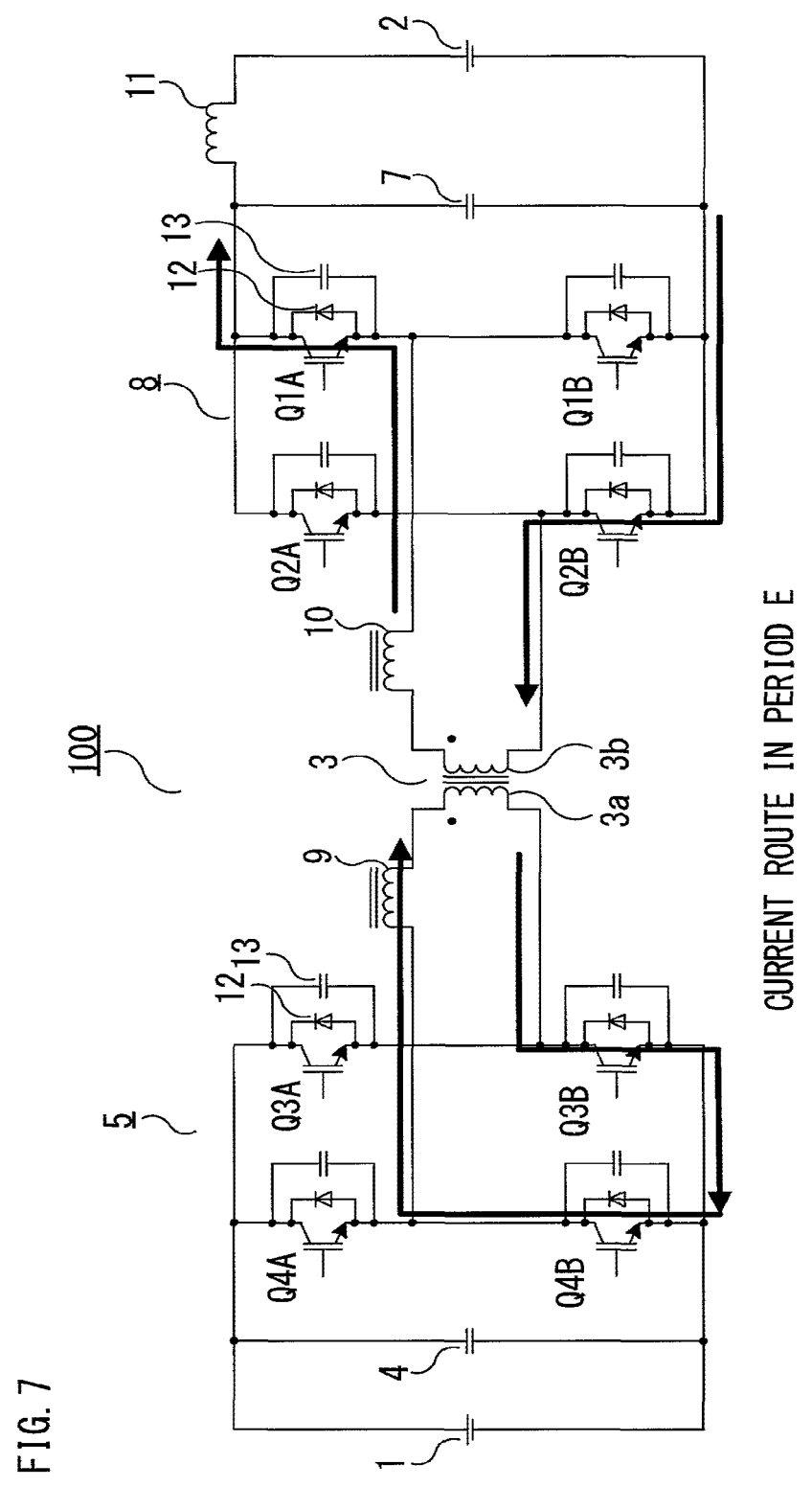

In the period E, in the first switching circuit 5, Q4A becomes OFF, and current circulates via the diode of Q4B, and Q3B. In the second switching circuit 8, since the diode of Q1A, and Q2B or the diode of Q2B are ON, circulation current gradually decreases due to voltage of the battery 2. When the circulation current becomes 0[A], the diode of Q1A becomes OFF and 0[A] is maintained. Therefore, the period E is a period during which the circulation current decreases (FIG. 7).

Figure 8:
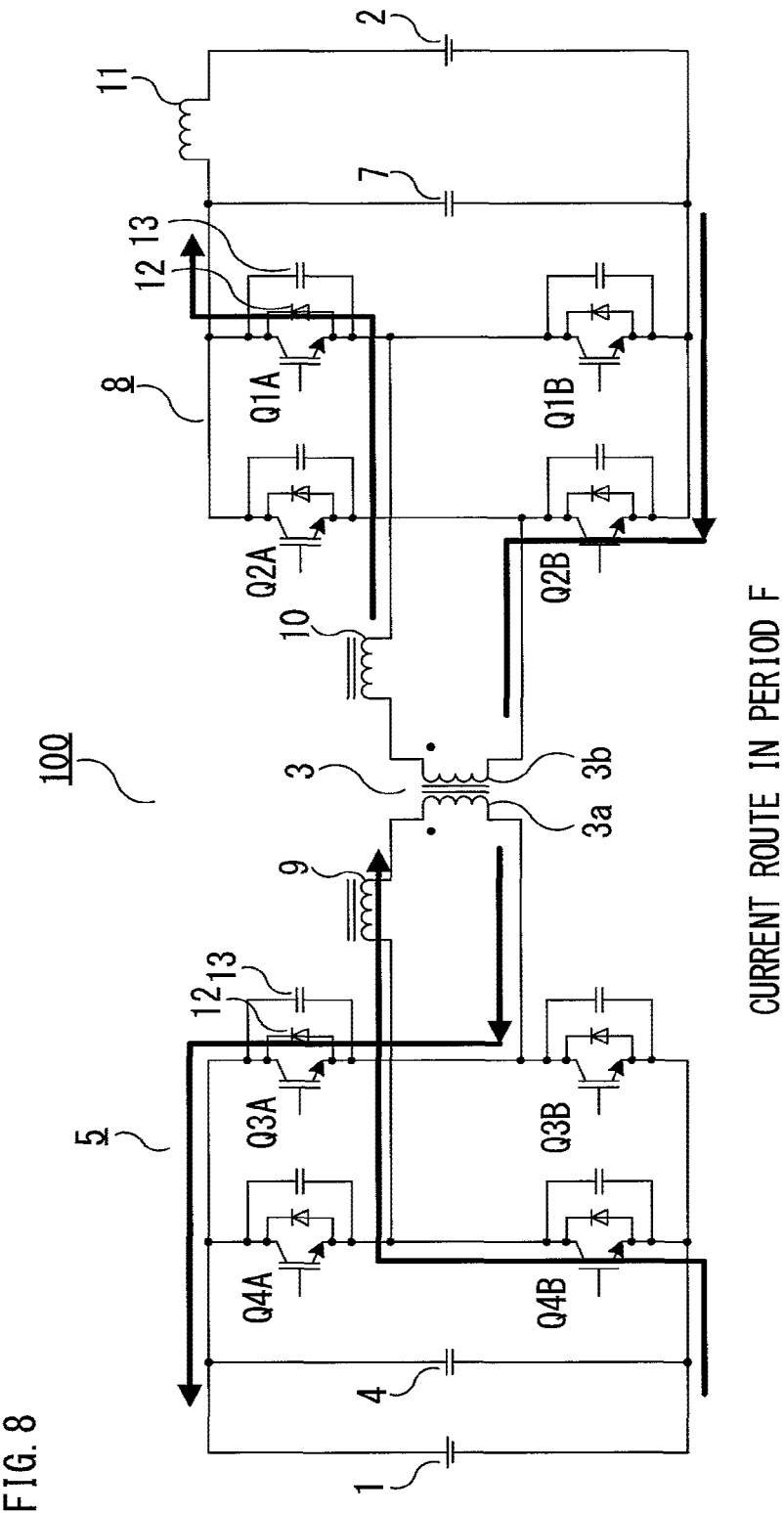
FIG. 8 is a current route diagram for explaining step-up charging operation of the battery charge/discharge device according to embodiment 1 of the present invention.

In the period F, in the first switching circuit 5, Q3B becomes OFF and Q4B becomes ON. Since Q4B is turned on from a diode conductive state, ZVS (zero voltage switching) is achieved. If, in the period E, the circulation current remains greater than 0[A], that is, some current remains, current is regenerated to the DC power supply 1 side via Q4B or the diode of Q4B, and the diode of Q3A. In the second switching circuit 8, since the diode of Q1A, and Q2B or the diode of Q2B are ON, circulation current gradually decreases due to (voltage of DC power supply 1−voltage of battery 2). When the circulation current becomes 0[A], the diode of Q1A becomes OFF and 0[A] is maintained. Therefore, the period F is a period during which the circulation current decreases (FIG. 8).

Figure 9:
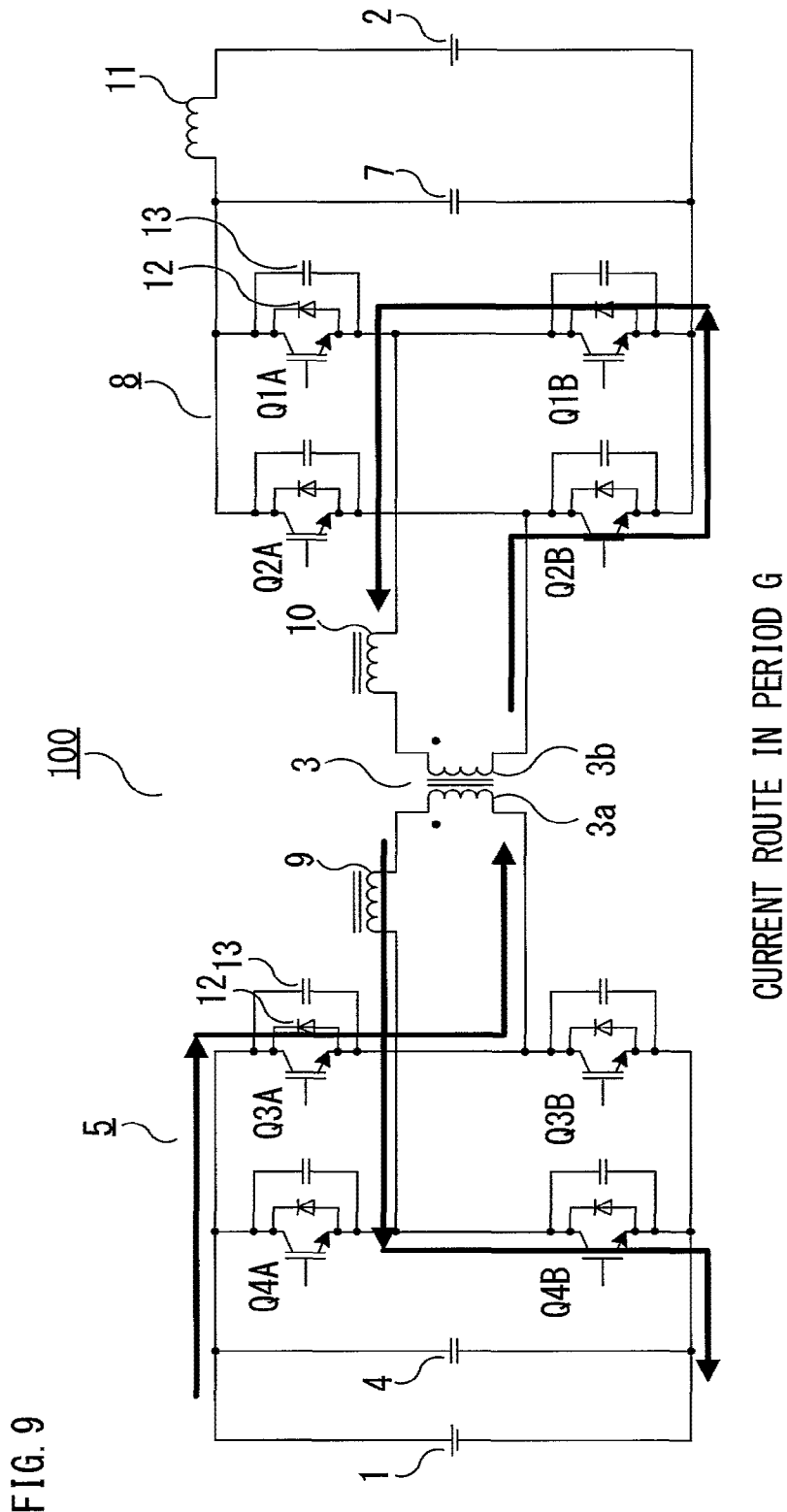
FIG. 9 is a diagram for explaining step-up charging operation of the battery charge/discharge device according to embodiment 1 of the present invention.

In the period G, in the first switching circuit 5, Q3A becomes ON, so that Q3A and Q4B are ON and thus two diagonal elements become conductive. Therefore, energy is transmitted from the DC power supply 1 side via Q3A and Q4B. At this time, the polarity of current is inverted from that in the period F. In the second switching circuit 8, since Q2B is ON, current circulates via the diode of Q1B, and Q2B. Therefore, the period G is a period during which the first reactor 9 and the second reactor 10 are excited (FIG. 9).

Figure 10:
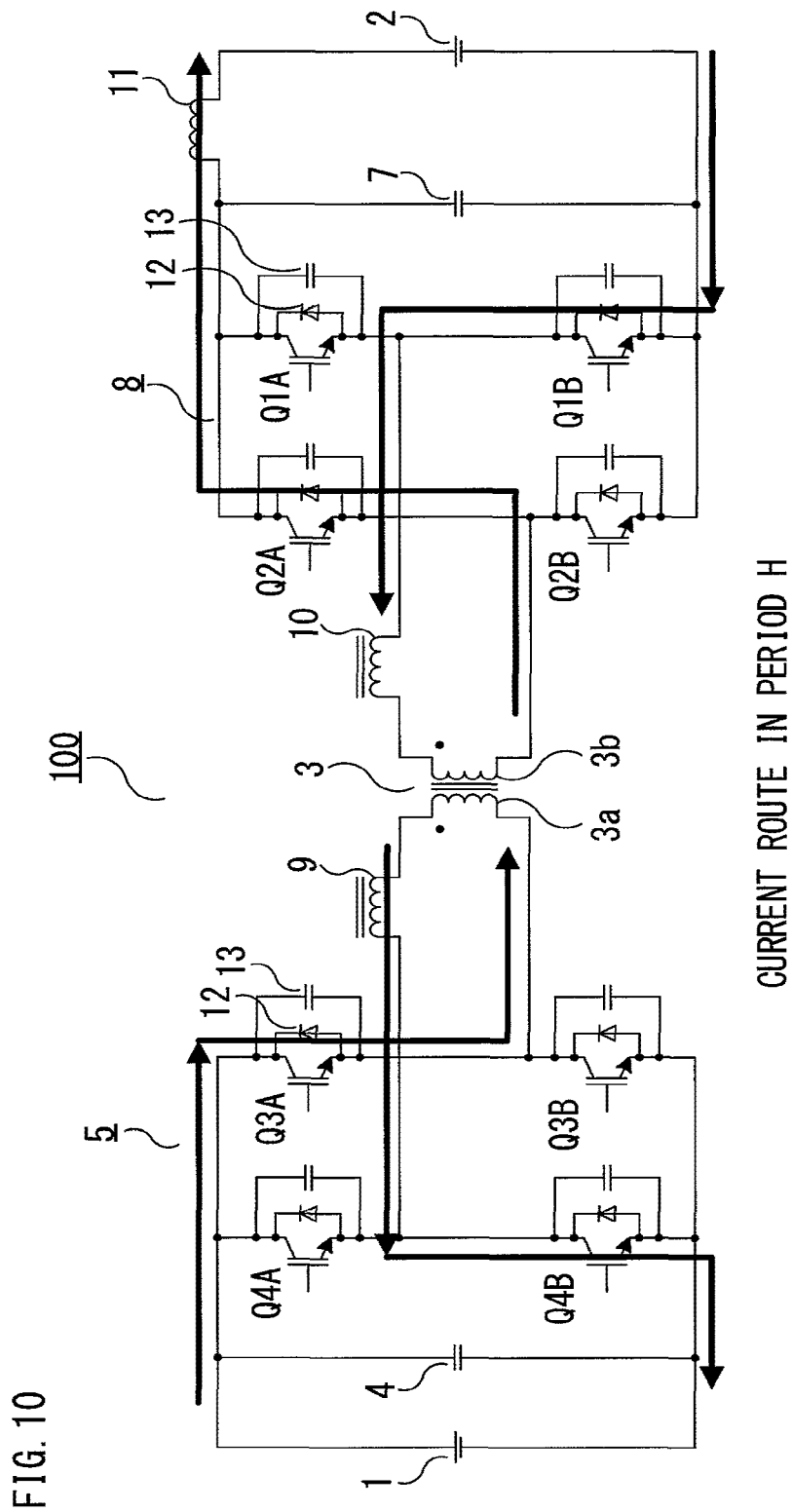
FIG. 10 is a current route diagram for explaining step-up charging operation of the battery charge/discharge device according to embodiment 1 of the present invention.

In the period H, in the first switching circuit 5, since Q3A and Q4B are ON and thus two diagonal elements become conductive, energy is transmitted from the DC power supply 1 side via Q3A and Q4B. In the second switching circuit 8, Q2B becomes OFF, current flows via the diode of Q2A and the diode of Q1B, and power is transmitted to the battery 2 side. Therefore, the period H is a period during which excitation energy of the first reactor 9 and the second reactor 10 is transmitted to the battery 2 side (FIG. 10).

Figure 11:
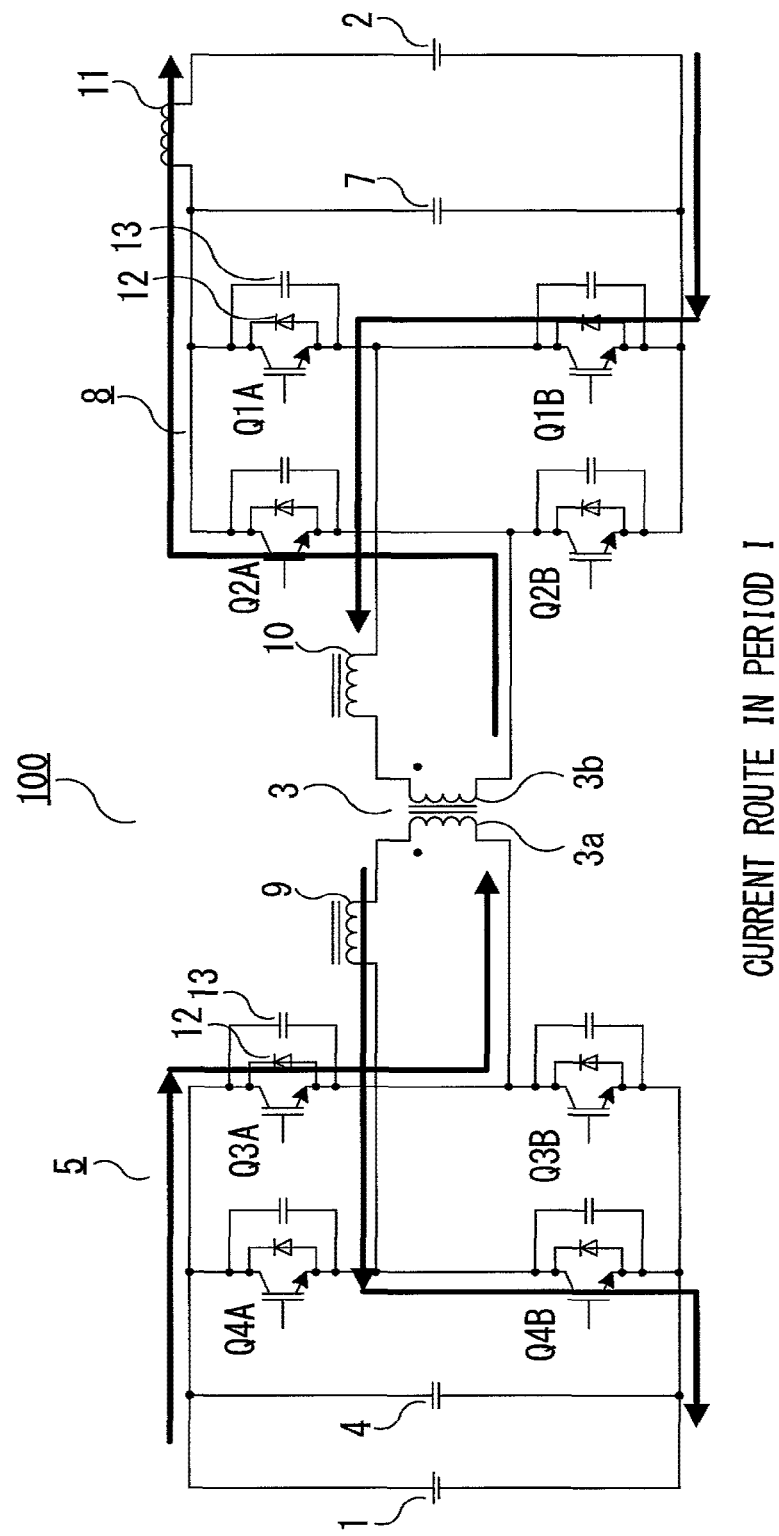
FIG. 11 is a current route diagram for explaining step-up charging operation of the battery charge/discharge device according to embodiment 1 of the present invention.

In the period I, in the first switching circuit 5, since Q3A and Q4B are ON and thus two diagonal elements become conductive, energy is transmitted from the DC power supply 1 side. In the second switching circuit 8, Q2A becomes ON, current flows via Q2A or the diode of Q2A, and the diode of Q1B, and power is transmitted to the battery 2 side. Therefore, the period I is a period during which excitation energy of the first reactor 9 and the second reactor 10 is transmitted to the battery 2 side (FIG. 11).

Figure 12:
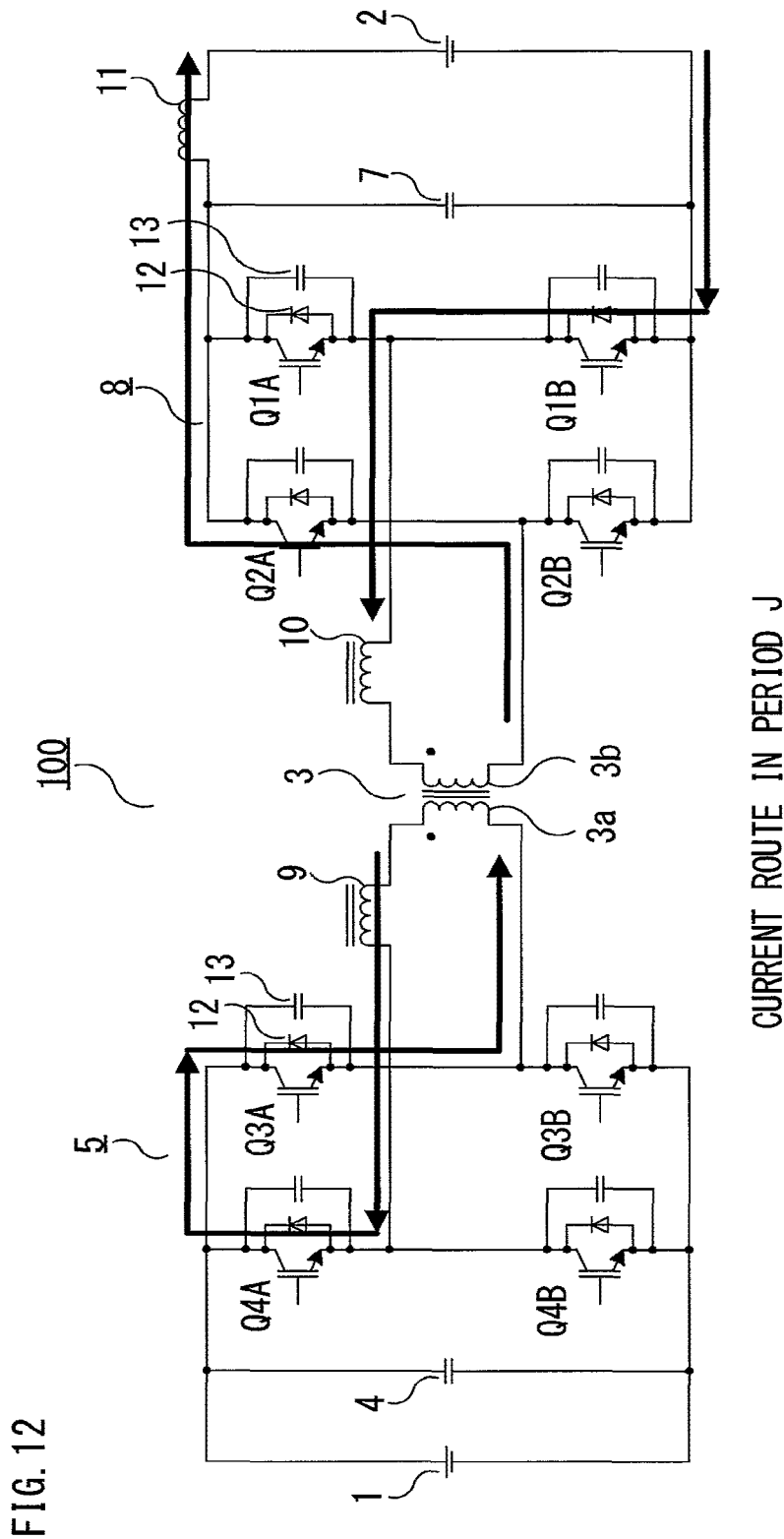
FIG. 12 is a current route diagram for explaining step-up charging operation of the battery charge/discharge device according to embodiment 1 of the present invention.

In the period J, in the first switching circuit 5, Q4B becomes OFF, and current circulates via the diode of Q4A, and Q3A. In the second switching circuit 8, since Q2A or the diode of Q2A, and the diode of Q1B are ON, circulation current gradually decreases due to voltage of the battery 2. When the circulation current becomes 0[A], the diode of Q1B becomes OFF and 0[A] is maintained. Therefore, the period J is a period during which the circulation current decreases (FIG. 12).

Figure 13:
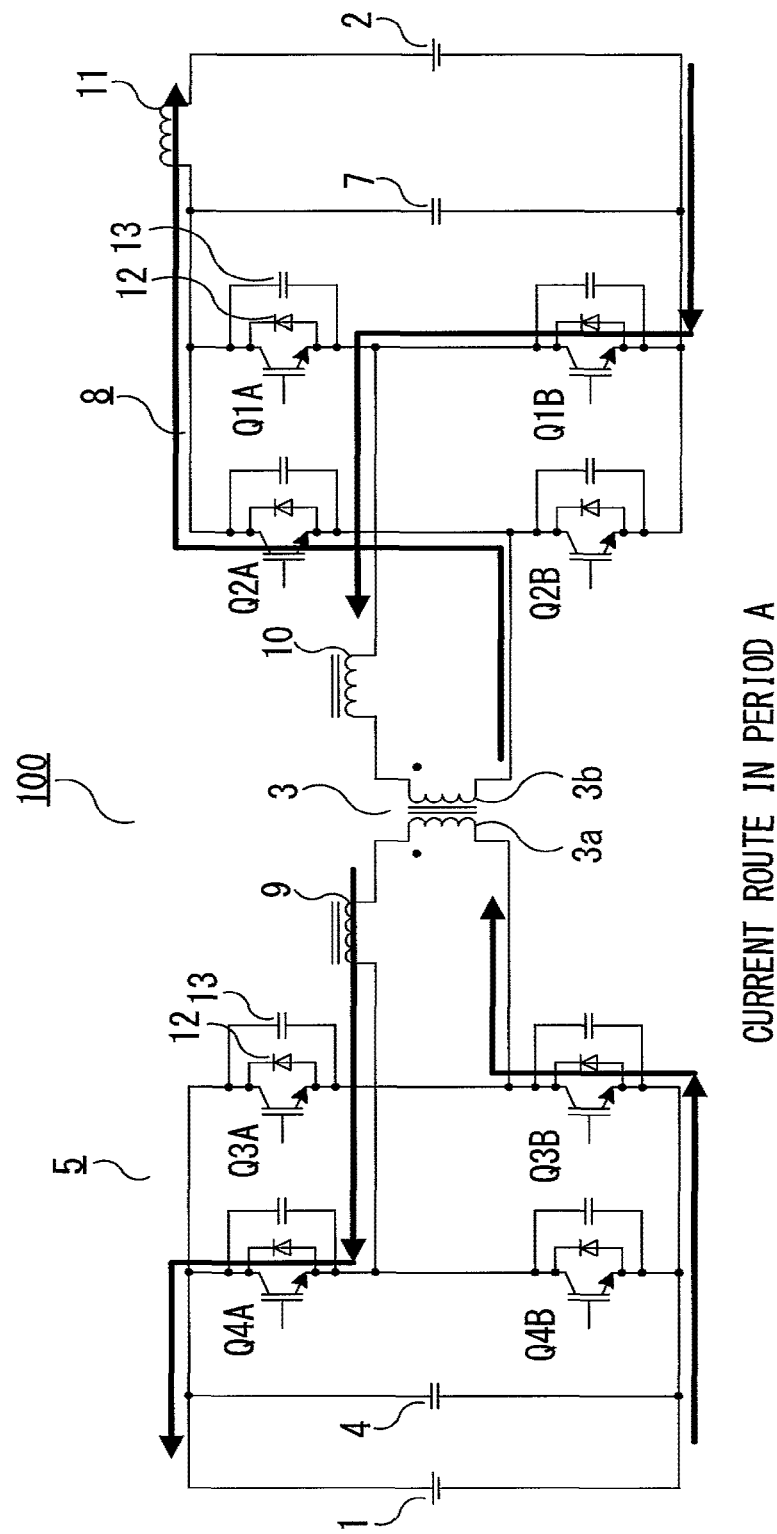
FIG. 13 is a current route diagram for explaining step-up charging operation of the battery charge/discharge device according to embodiment 1 of the present invention.

Next, in the period A, in the first switching circuit 5, Q3A becomes OFF and Q4A becomes ON. Since Q4A is turned on from a diode conductive state, ZVS (zero voltage switching) is achieved. If, in the period J, the circulation current remains greater than 0[A], that is, some current remains, current is regenerated to the DC power supply 1 side via Q4A or the diode of Q4A, and the diode of Q3B. In the second switching circuit 8, since Q2A or the diode of Q2A, and the diode of Q1B are ON, the circulation current gradually decreases due to (voltage of DC power supply 1−voltage of battery 2). When the circulation current becomes 0[A], the diode of Q1B becomes OFF and 0[A] is maintained. Therefore, the period A is a period during which the circulation current decreases (FIG. 13).

Through repetition of such a series of controls (periods A to J), the battery charge/discharge device 100 steps up voltage generated on the second winding 3b of the transformer 3 and supplies power to the battery 2.

If voltage of the DC power supply 1 is denoted by VL, the first switching circuit 5 outputs a positive pulse of voltage VL during the diagonal ON time t1 during which Q4A and Q3B are simultaneously ON, and a negative pulse of voltage (−VL) during the diagonal ON time t1a during which Q4B and Q3A are simultaneously ON, to apply these pulses to the first winding 3a of the transformer 3. If the turns ratio between the first winding 3a and the second winding 3b of the transformer 3 is NL:NB, at this time, voltage of (±VL)× NB/NL is applied to the second winding 3b of the transformer 3.

In the second switching circuit 8, in the diagonal ON time (t1, t1a) during which voltage is applied to the transformer 3, a period during which the second reactor 10 is excited is provided, that is, step-up operation is performed using the second reactor 10 as a step-up reactor.

All the switching operations of the semiconductor switching elements Q in the first switching circuit 5 on the primary side of the transformer 3 are zero voltage switching, owing to effects of the capacitor 13 and the first reactor 9. As for the switching operations in the second switching circuit 8 on the secondary side, some of them are zero voltage switching.

Q1A and Q1B in the second bridge circuit (Q1A, Q1B) are kept in OFF states. Therefore, during the periods E and F, when the circulation current decreases to be 0[A], the diode of Q1A becomes OFF and 0[A] is maintained, so that reverse current does not flow. Also during the periods J and A, when the circulation current decreases to be 0[A], the diode of Q1B becomes OFF and 0[A] is maintained, so that reverse current does not flow.

Figure 14:
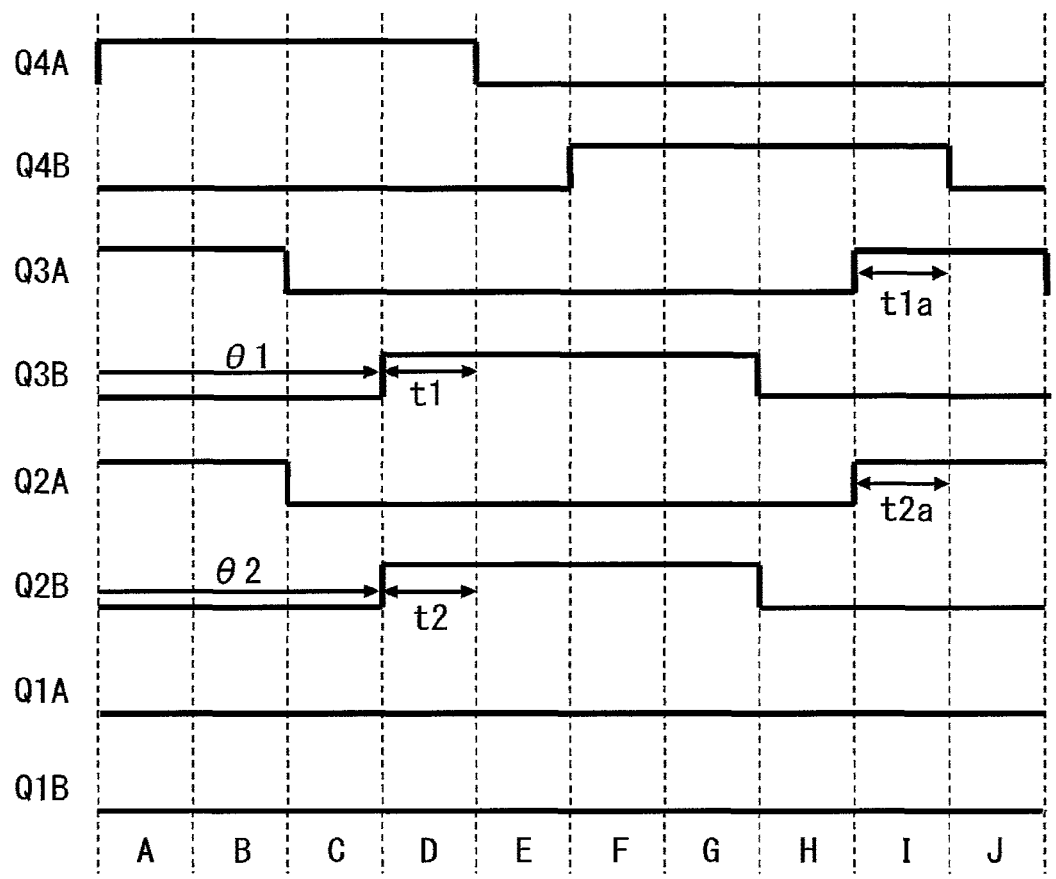
FIG. 14 is a drive signal waveform diagram in the case of step-down charging of the battery charge/discharge device according to embodiment 1 of the present invention.

Next, FIG. 14 is a diagram showing waveforms of the drive signals 21a and 21b for the semiconductor switching elements Q of the first switching circuit 5 and the second switching circuit 8 in the case of step-down charging of the battery charge/discharge device 100. Also in this case, periods A to J are provided and shown for respective plural gate patterns which are combination patterns of the drive signals, and for convenience sake, the drive signals for Q4A, Q4B, Q3A, Q3B, Q2A, Q2B, Q1A, and Q1B are denoted by the reference characters of the respective elements.

As in the case of step-up charging shown in FIG. 3, all the drive signals are generated based on, as reference, the first bridge circuit (Q4A, Q4B) in the first switching circuit 5. Q1A and Q1B in the second bridge circuit (Q1A, Q1B) in the second switching circuit 8 are kept in off states. Regarding three bridge circuits other than the second bridge circuit (Q1A, Q1B), Q4A, Q3A, Q2A on the positive side (high voltage side) and Q4B, Q3B, Q2B on the negative side (low voltage side) which compose the respective bridge circuits are each controlled with an ON time ratio of 50% excluding the short-circuit prevention time.

The phase shift amount θ1 (first phase shift amount) of the drive signal for the first diagonal element Q3B relative to a phase of the drive signal for the first reference element Q4A, and the phase shift amount θ2 (second phase shift amount) of the drive signal for the second diagonal element Q2B relative to a phase of the drive signal for the first reference element Q4A, are determined in accordance with a DUTY ratio which is a control command. In this case, the phase shift amounts θ1 and θ2 are equal to each other, and both phase shift amounts θ1 and θ2 vary in accordance with the DUTY ratio.

Also in this case, the diagonal ON times t1 and t1a are determined depending on the phase shift amount θ1. In addition, for the second bridge circuit (Q1A, Q1B), drive signals equal to the drive signals for the first bridge circuit (Q4A, Q4B) are assumed as virtual drive signals, and then the virtual diagonal ON times t2 and t2a described above are determined depending on the phase shift amount θ2. In this case, the diagonal ON times t1 and t1a and the virtual diagonal ON times t2 and t2a are equal to each other.

FIG. 15 to FIG. 24 show current routes according to the respective gate patterns shown in FIG. 14. FIG. 15 to FIG. 24 respectively correspond to the periods D to J and the periods A to C in FIG. 14, in this order.

Hereinafter, based on FIG. 14 and FIG. 15 to FIG. 24, operation of the battery charge/discharge device 100 in one cycle will be described. It is noted that voltage of the battery 2 is lower than voltage generated on the second winding 3b, and power is transmitted from the DC power supply 1 to the battery 2.

For convenience sake, the description starts from the period D.

Figure 15:
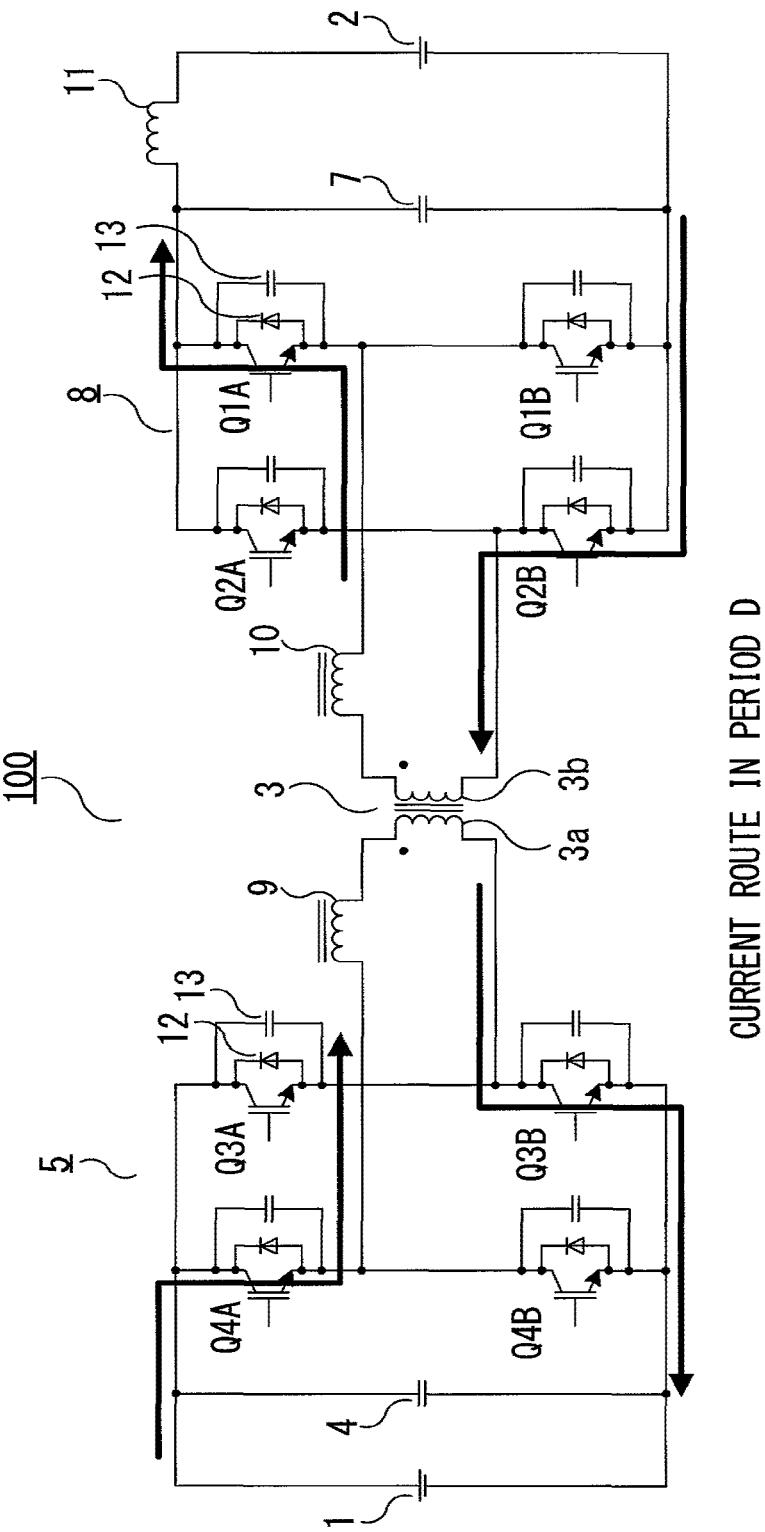
FIG. 15 is a current route diagram for explaining step-down charging operation of the battery charge/discharge device according to embodiment 1 of the present invention.

In the period D, in the first switching circuit 5, Q3B becomes ON, so that Q4A and Q3B are ON and thus two diagonal elements become conductive. Therefore, energy is transmitted from the DC power supply 1 side. In the second switching circuit 8, Q2B becomes ON, current flows from the diode of Q1A via Q2B or the diode of Q2B, and power is transmitted to the battery 2 side. Therefore, the period D is a period during which power is transmitted to the battery 2 side (FIG. 15).

Figure 16:
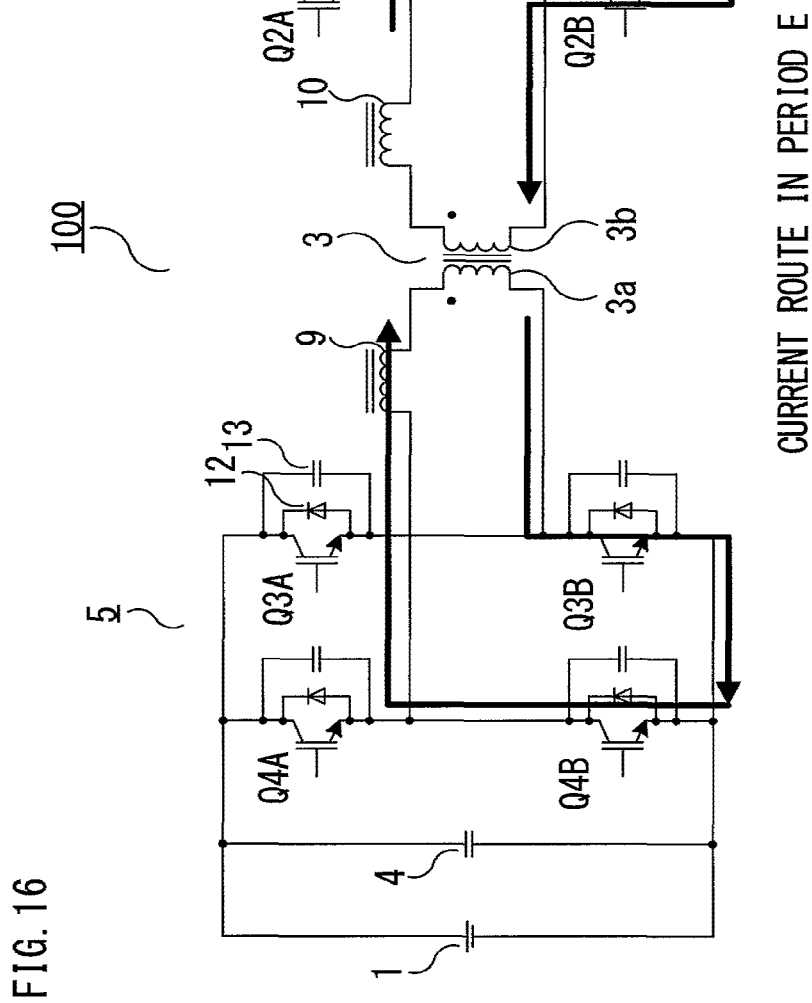
FIG. 16 is a current route diagram for explaining step-down charging operation of the battery charge/discharge device according to embodiment 1 of the present invention.

In the period E, in the first switching circuit 5, Q4A becomes OFF, and current circulates via the diode of Q4B, and Q3B. In the second switching circuit 8, since the diode of Q1A, and Q2B or the diode of Q2B are ON, circulation current gradually decreases due to voltage of the battery 2. When the circulation current becomes 0[A], the diode of Q1A becomes OFF and 0[A] is maintained. Therefore, the period E is a period during which the circulation current decreases (FIG. 16).

In the periods F and G, in the first switching circuit 5, Q4B becomes ON, and current circulates via Q4B or the diode of Q4B, and Q3B. Since Q4B is turned on from a diode conductive state, ZVS (zero voltage switching) is achieved.

Figure 17:
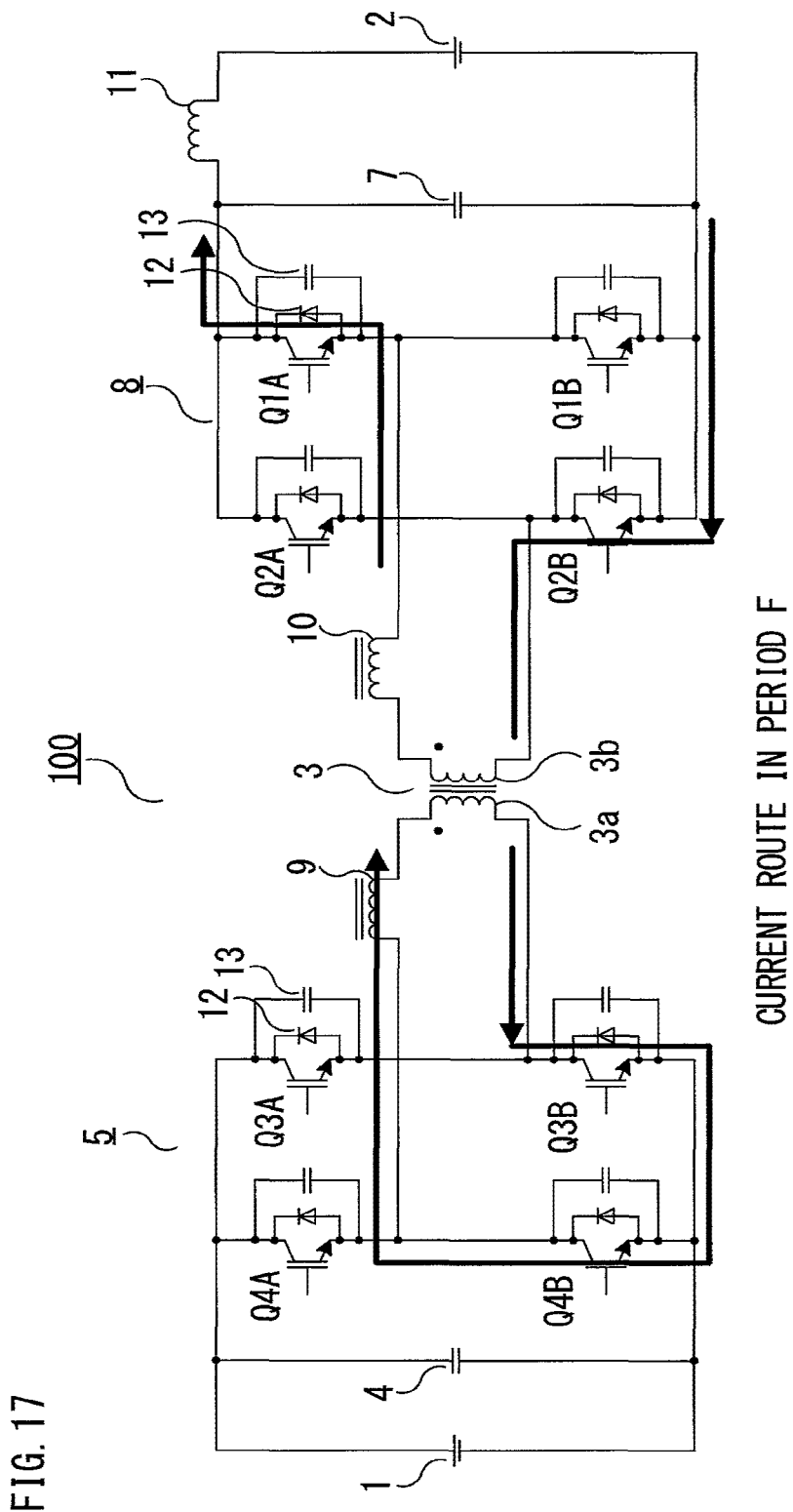
FIG. 17 is a current route diagram for explaining step-down charging operation of the battery charge/discharge device according to embodiment 1 of the present invention.
Figure 18:
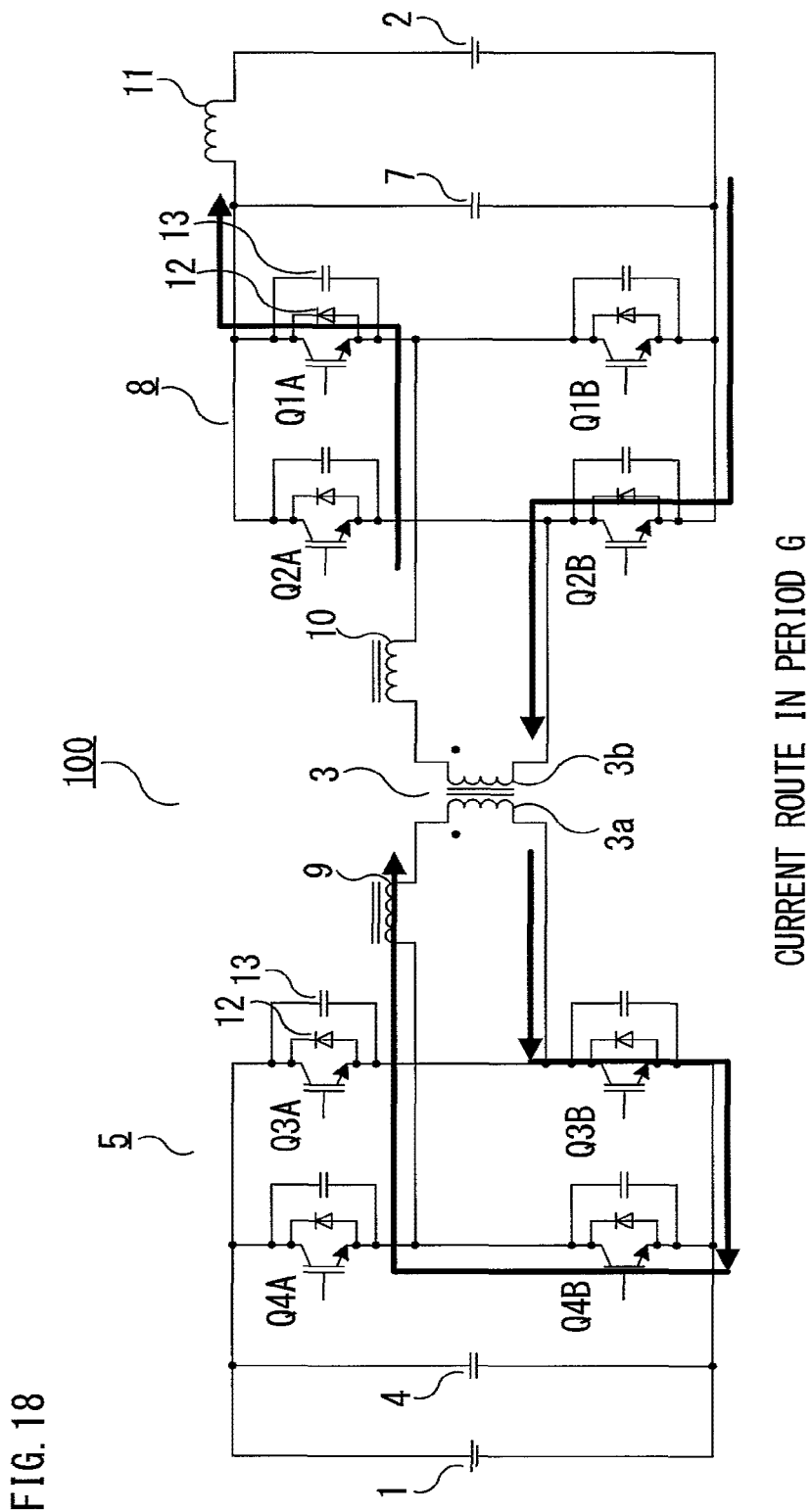
FIG. 18 is a current route diagram for explaining step-down charging operation of the battery charge/discharge device according to embodiment 1 of the present invention.

In the second switching circuit 8, since the diode of Q1A, and Q2B or the diode of Q2B are ON, circulation current gradually decreases due to voltage of the battery 2. When the circulation current becomes 0[A], the diode of Q1A becomes OFF and 0[A] is maintained. Therefore, the periods F and G are periods during which the circulation current decreases (FIG. 17, FIG. 18).

Figure 19:
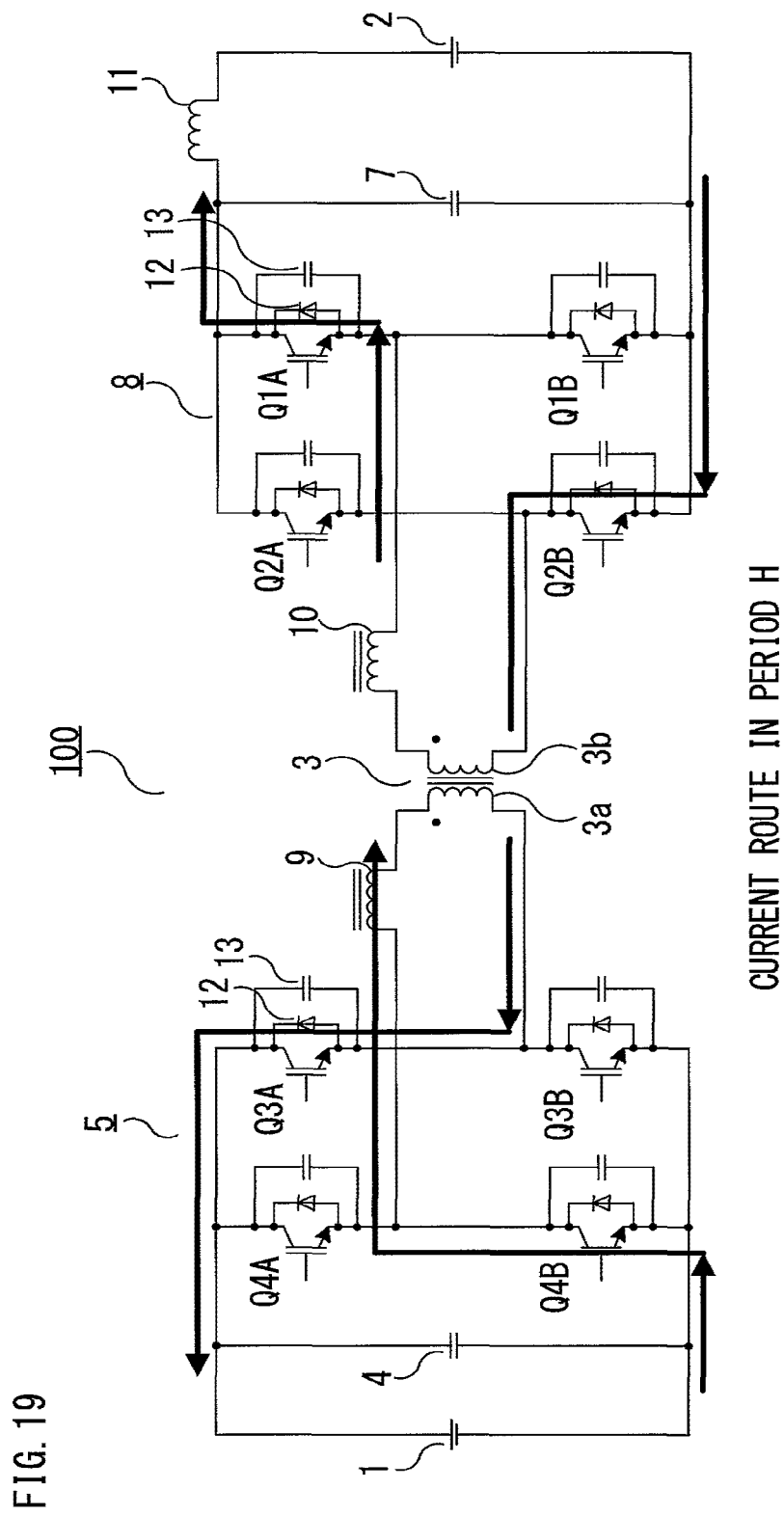
FIG. 19 is a current route diagram for explaining step-down charging operation of the battery charge/discharge device according to embodiment 1 of the present invention.

In the period H, in the first switching circuit 5, Q3B becomes OFF. If the circulation current remains greater than 0[A], that is, some current remains, current is regenerated to the DC power supply 1 side via Q4B or the diode of Q4B, and the diode of Q3A. In the second switching circuit 8, although Q2B becomes OFF, since the diode of Q1A and the diode of Q2B are ON, circulation current gradually decreases due to (voltage of DC power supply 1−voltage of battery 2). When the circulation current becomes 0[A], the diode of Q1A becomes OFF and 0[A] is maintained. Therefore, the period H is a period during which the circulation current decreases (FIG. 19).

Figure 20:
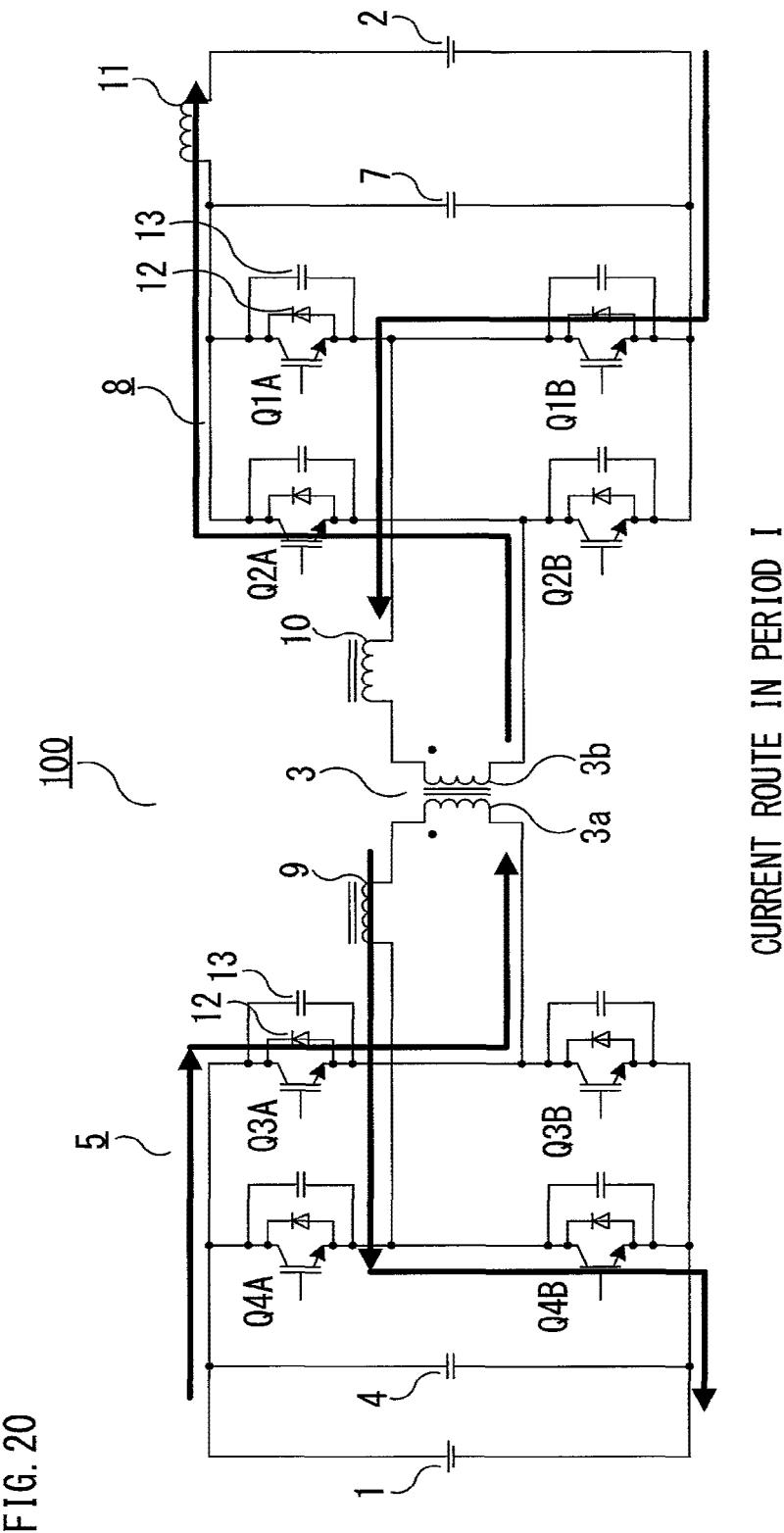
FIG. 20 is a current route diagram for explaining step-down charging operation of the battery charge/discharge device according to embodiment 1 of the present invention.

In the period I, in the first switching circuit 5, Q3A becomes ON, so that Q3A and Q4B are ON and thus two diagonal elements become conductive. Therefore, energy is transmitted from the DC power supply 1 side via Q3A and Q4B. At this time, the polarity of current is inverted from that in the period H. In the second switching circuit 8, Q2A becomes ON, current flows via Q2A or the diode of Q2A, and the diode of Q1B, and power is transmitted to the battery 2 side. Therefore, the period I is a period during which power is transmitted to the battery 2 side (FIG. 20).

Figure 21:
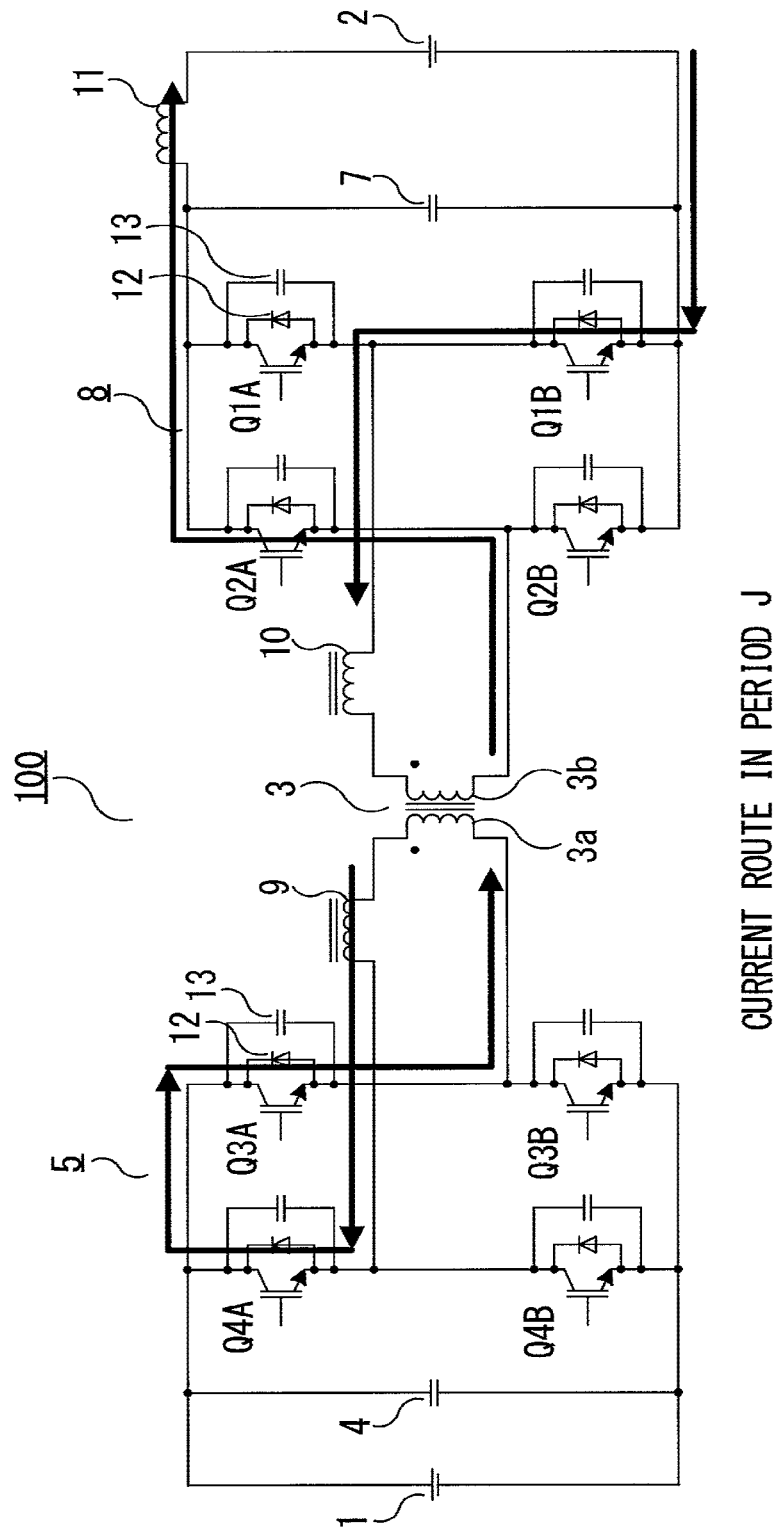
FIG. 21 is a current route diagram for explaining step-down charging operation of the battery charge/discharge device according to embodiment 1 of the present invention.

In the period J, in the first switching circuit 5, Q4B becomes OFF, and current circulates via the diode of Q4A, and Q3A. In the second switching circuit 8, since the diode of Q1B, and Q2A or the diode of Q2A are ON, circulation current gradually decreases due to voltage of the battery 2. When the circulation current becomes 0[A], the diode of Q1B becomes OFF and 0[A] is maintained. Therefore, the period J is a period during which the circulation current decreases (FIG. 21).

Figure 22:
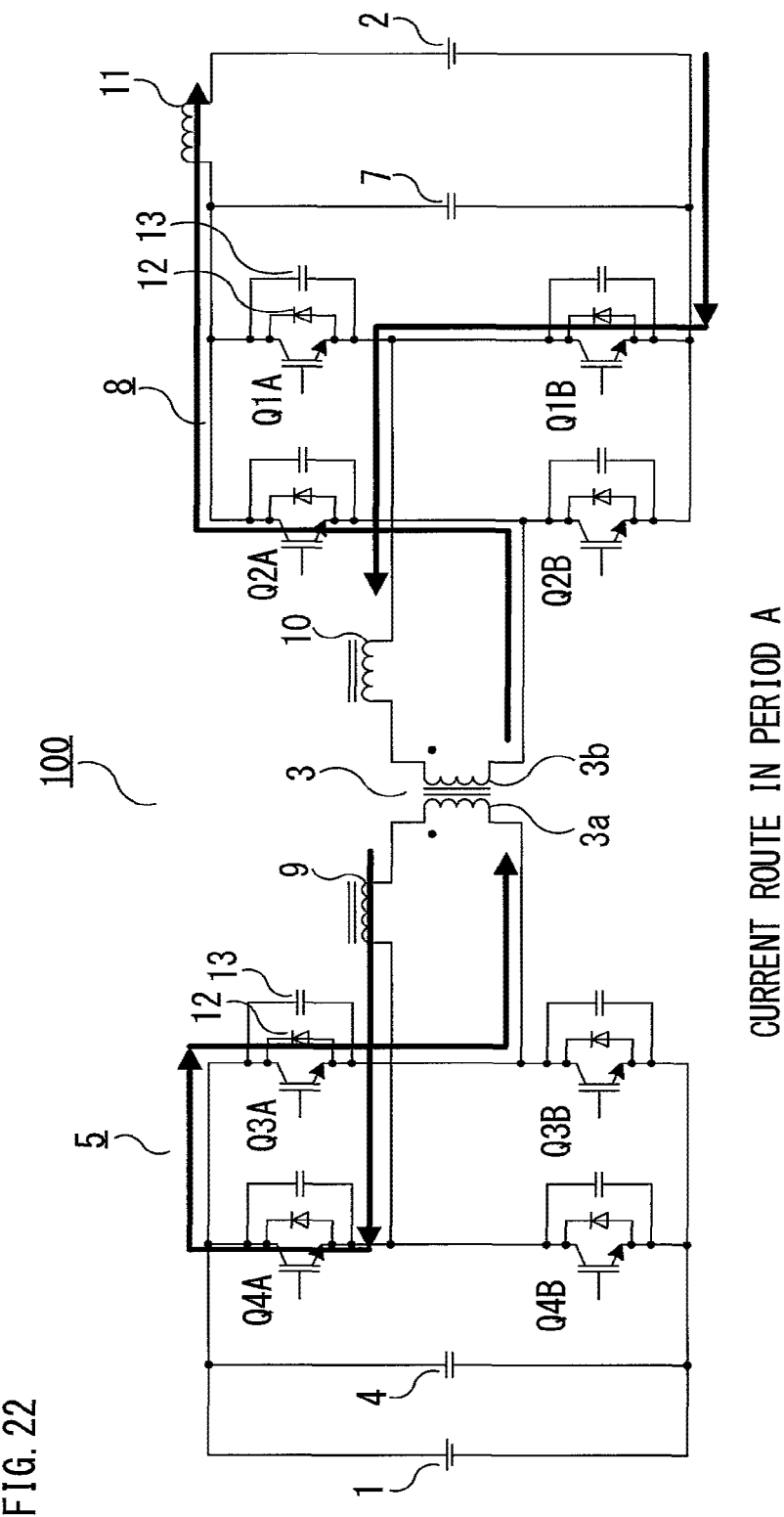
FIG. 22 is a current route diagram for explaining step-down charging operation of the battery charge/discharge device according to embodiment 1 of the present invention.
Figure 23:
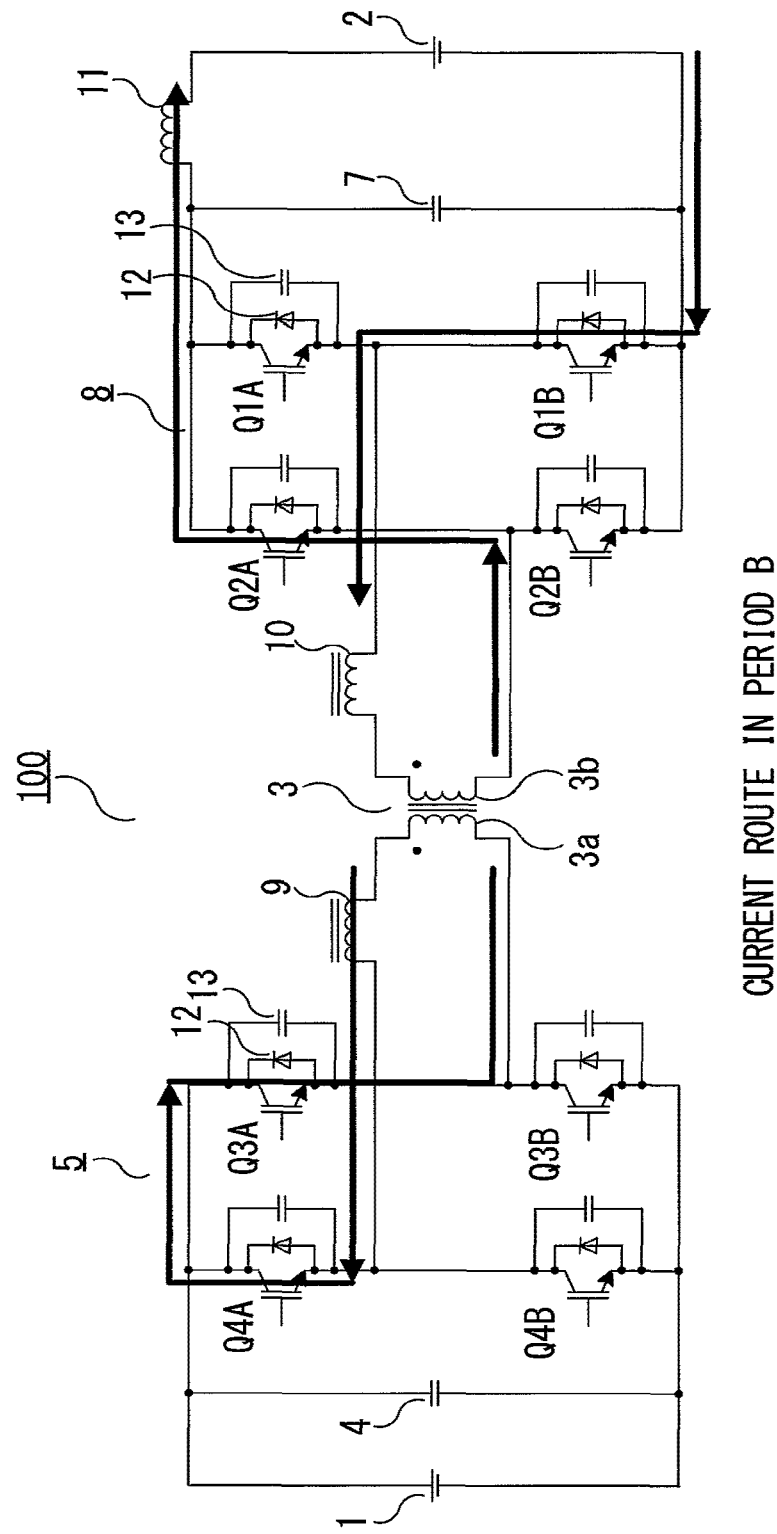
FIG. 23 is a current route diagram for explaining step-down charging operation of the battery charge/discharge device according to embodiment 1 of the present invention.

Next, in the periods A and B, in the first switching circuit 5, Q4A becomes ON, and current circulates via Q4A or the diode of Q4A, and Q3A. Since Q4A is turned on from a diode conductive state, ZVS (zero voltage switching) is achieved. In the second switching circuit 8, since the diode of Q1B, and Q2A or the diode of Q2A are ON, circulation current gradually decreases due to voltage of the battery 2. When the circulation current becomes 0[A], the diode of Q1B becomes OFF and 0[A] is maintained. Therefore, the period J is a period during which the circulation current decreases (FIG. 22, FIG. 23).

Figure 24:
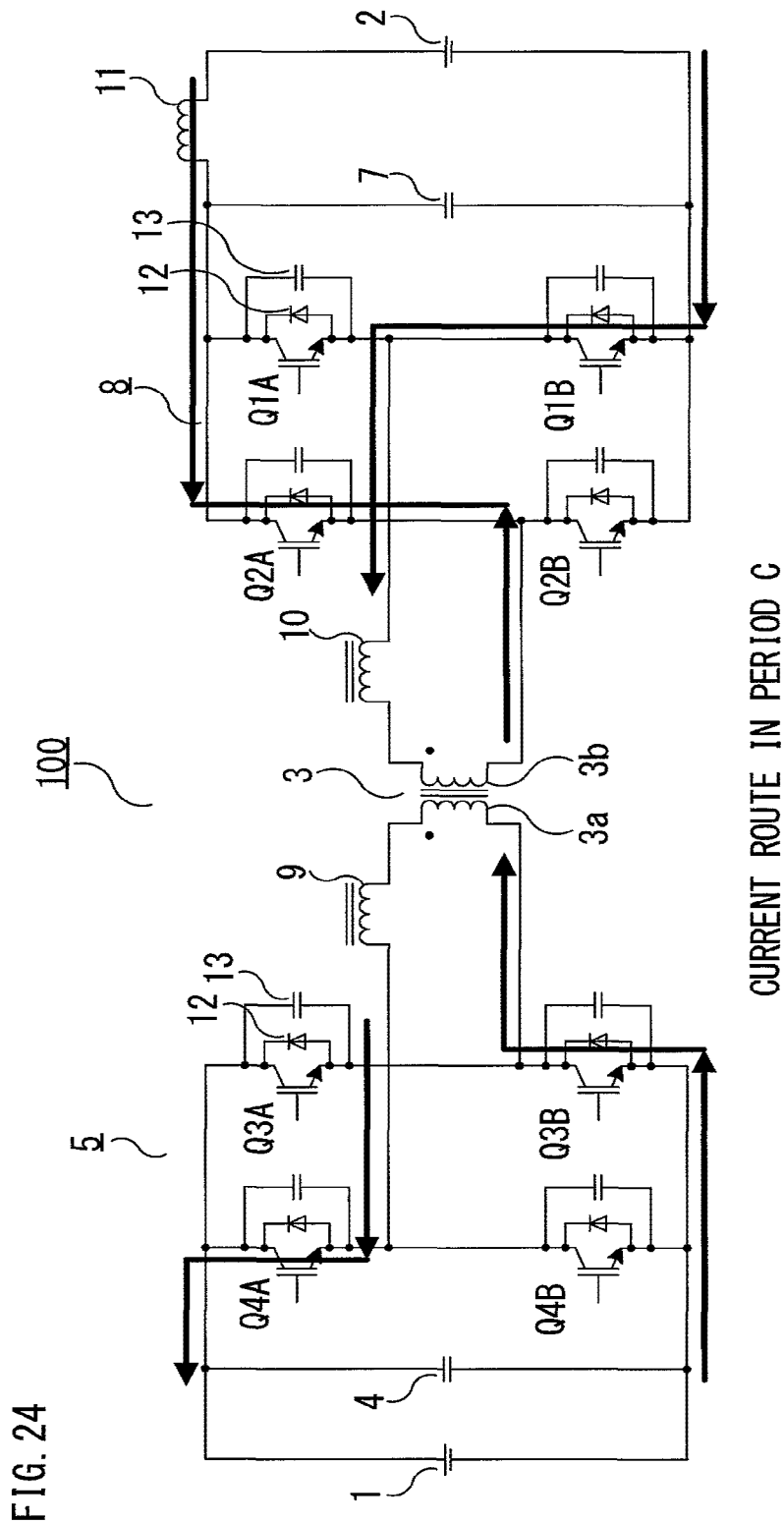
FIG. 24 is a current route diagram for explaining step-down charging operation of the battery charge/discharge device according to embodiment 1 of the present invention.

In the period C, in the first switching circuit 5, Q3A becomes OFF. If the circulation current remains greater than 0[A], that is, some current remains, current is regenerated to the DC power supply 1 side via Q4A or the diode of Q4A, and the diode of Q3B. In the second switching circuit 8, although Q2A becomes OFF, since the diode of Q2A and the diode of Q1B are ON, circulation current gradually decreases due to (voltage of DC power supply 1−voltage of battery 2). When the circulation current becomes 0[A], the diode of Q1B becomes OFF and 0[A] is maintained. Therefore, the period C is a period during which the circulation current decreases (FIG. 24).

Through repetition of such a series of controls (periods A to J), the battery charge/discharge device 100 steps down voltage generated on the second winding 3b of the transformer 3 and supplies power to the battery 2.

All the switching operations of the semiconductor switching elements Q in the first switching circuit 5 on the primary side of the transformer 3 are zero voltage switching, owing to effects of the capacitor 13 and the first reactor 9. As for the switching operations in the second switching circuit 8 on the secondary side, some of them are zero voltage switching.

Q1A and Q1B in the second bridge circuit (Q1A, Q1B) are kept in OFF states. Therefore, during the periods E to H, when the circulation current decreases to be 0[A], the diode of Q1A becomes OFF and 0[A] is maintained, so that reverse current does not flow. Also during the periods J and A to C, when the circulation current decreases to be 0[A], the diode of Q1B becomes OFF and 0[A] is maintained, so that reverse current does not flow.

Next, the case where the battery charge/discharge device 100 transmits power from the battery 2 to the DC power supply 1 will be described.

Figure 25:
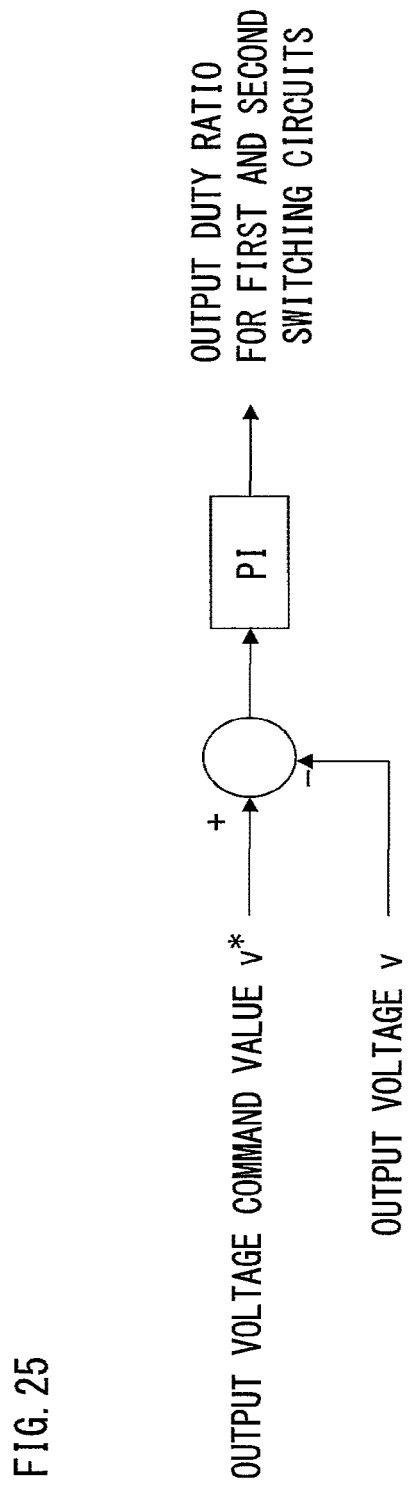
FIG. 25 is a control block diagram when the battery charge/discharge device is discharged, according to embodiment 1 of the present invention.

FIG. 25 is a control block diagram in the case where the battery charge/discharge device 100 transmits power from the battery 2 to the DC power supply 1, that is, discharges the battery 2. In this case, the battery charge/discharge device 100 performs output to the DC power supply 1, and the voltage v of the first smoothing capacitor 4 is detected as output voltage, which is then inputted to the control circuit 20. As shown in FIG. 25, in the control circuit 20, the inputted output voltage v is compared with an output voltage command value v*, a difference therebetween is fed back to determine an output DUTY ratio (DUTY ratio) for the first switching circuit 5 and the second switching circuit 8, and the drive signals 21a and 21b for the semiconductor switching elements Q are determined.

The operation in the case where power is supplied from the battery 2 is opposite to the operation in the case where power is supplied from the DC power supply 1. Therefore, the second smoothing capacitor 7 connected in parallel to the battery 2 has the same DC voltage as that of the battery 2.

Figure 26:
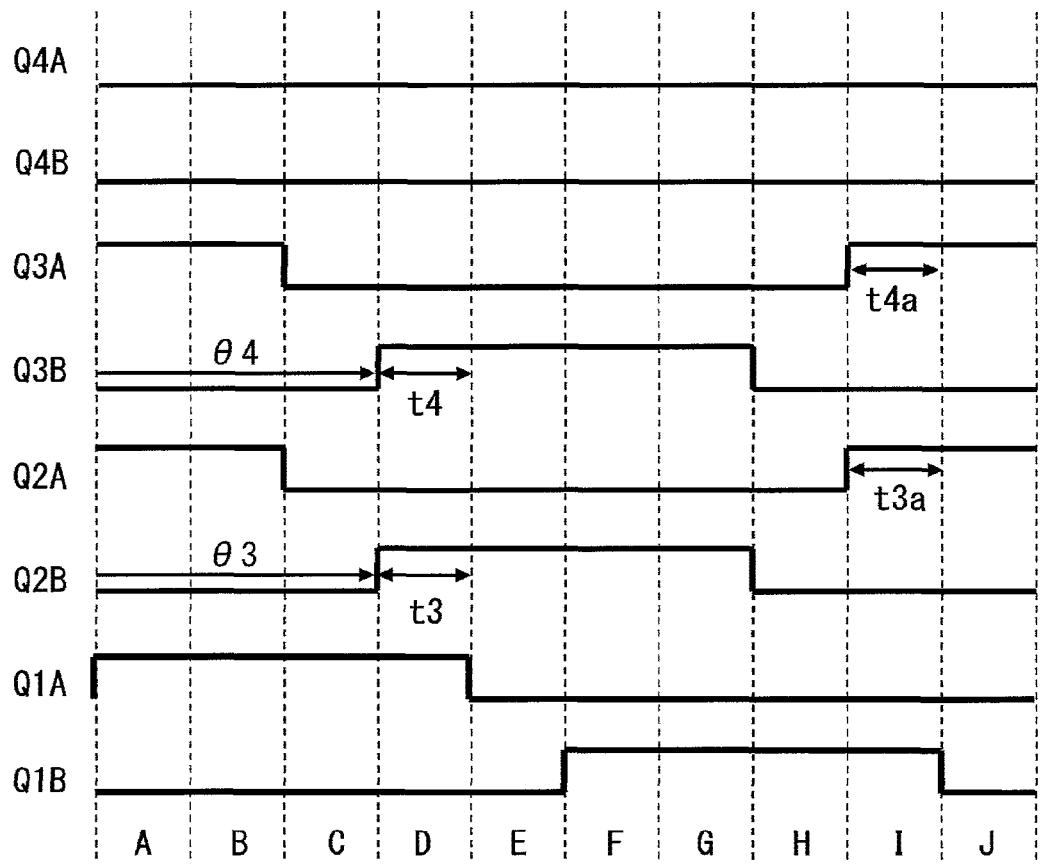
FIG. 26 is a drive signal waveform diagram in the case of step-down discharging of the battery charge/discharge device according to embodiment 1 of the present invention.
Figure 27:
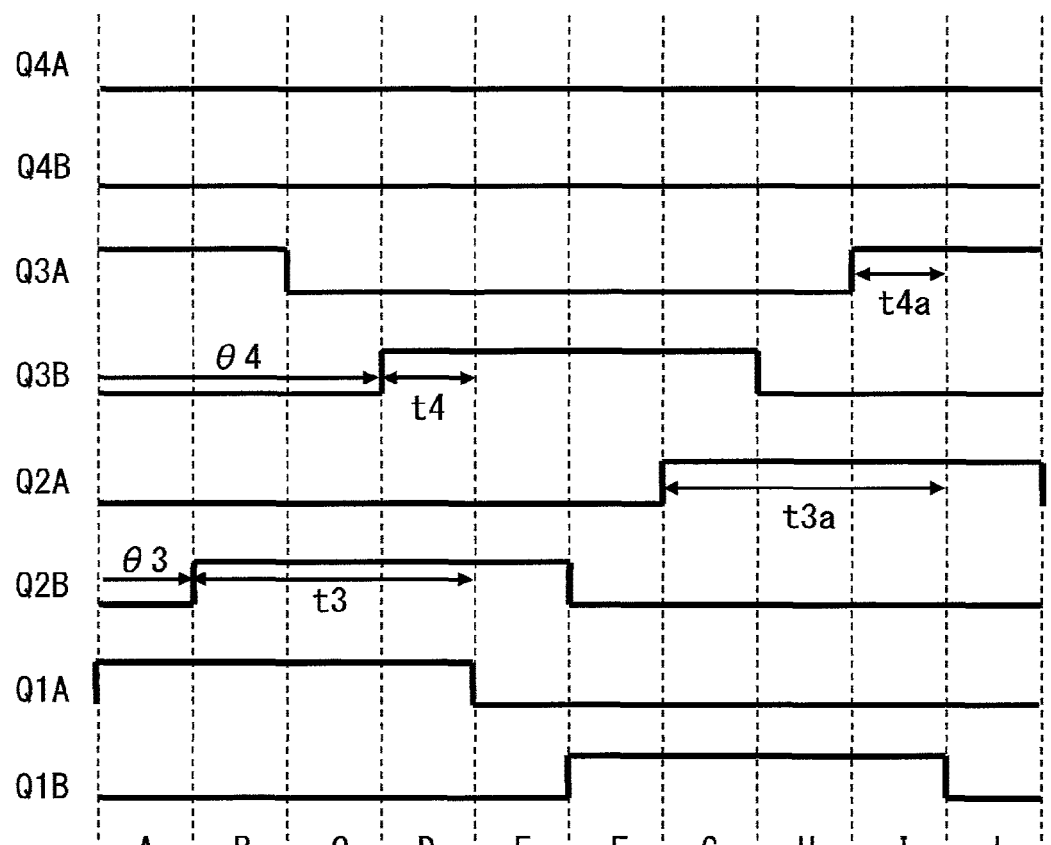
FIG. 27 is a drive signal waveform diagram in the case of step-up discharging of the battery charge/discharge device according to embodiment 1 of the present invention.

FIG. 26 is a diagram showing waveforms of the drive signals 21a and 21b for the semiconductor switching elements Q of the first switching circuit 5 and the second switching circuit 8 in the case of step-down discharging of the battery charge/discharge device 100. FIG. 27 is a diagram showing waveforms of the drive signals 21a and 21b for the semiconductor switching elements Q of the first switching circuit 5 and the second switching circuit 8 in the case of step-up discharging of the battery charge/discharge device 100.

As shown in FIG. 26, operation in step-down discharging of the battery charge/discharge device 100 is opposite to that in step-down charging, and corresponds to operation obtained by replacing the drive signals for the first switching circuit 5 and the drive signals for the second switching circuit 8 in step-down charging with each other. In addition, operation during each period A to J also corresponds to operation obtained by reversing operation in step-down charging between the first switching circuit 5 and the second switching circuit 8.

As shown in FIG. 27, operation in step-up discharging of the battery charge/discharge device 100 is opposite to that in step-up charging, and corresponds to operation obtained by replacing the drive signals for the first switching circuit 5 and the drive signals for the second switching circuit 8 in step-up charging with each other. In addition, operation during each period A to J also corresponds to operation obtained by reversing operation in step-down charging between the first switching circuit 5 and the second switching circuit 8.

If voltage of the battery 2 is denoted by VB, the second switching circuit 8 outputs a positive pulse of voltage VB during a diagonal ON time t3 during which Q1A (second reference element) and Q2B (second diagonal element) are simultaneously ON, and a negative pulse of voltage (−VB) during a diagonal ON time t3a during which Q1B and Q2A are simultaneously ON, to apply these pulses to the second winding 3b of the transformer 3. If the turns ratio between the first winding 3a and the second winding 3b of the transformer 3 is NL:NB, at this time, voltage of (±VB)× NL/NB is applied to the first winding 3a of the transformer 3.

In step-down discharging shown in FIG. 26, voltage of the DC power supply 1 is lower than voltage generated on the first winding 3a, and in step-up discharging shown in FIG. 27, voltage of the DC power supply 1 is higher than voltage generated on the first winding 3a. In both step-down discharging and step-up discharging, power is transmitted from the battery 2 to the DC power supply 1.

In battery discharging in which the battery charge/discharge device 100 transmits power from the battery 2 to the DC power supply 1, the first switching circuit 5 and the second switching circuit 8 are controlled as follows.

All the drive signals are generated based on, as reference, the second bridge circuit (Q1A, Q1B) in the second switching circuit 8. Q4A and Q4B in the first bridge circuit (Q4A, Q4B) in the first switching circuit 5 are kept in off states.

Regarding three bridge circuits other than the first bridge circuit (Q4A, Q4B), Q1A, Q2A, Q3A on the positive side (high voltage side) and Q1B, Q2B, Q3B on the negative side (low voltage side) which compose the respective bridge circuits are each controlled with an ON time ratio of 50% excluding the short-circuit prevention time. In this case, in switching of each semiconductor switching element Q in the second switching circuit 8 on a power transmitting side, the control circuit 20 performs control so that, during the short-circuit prevention time, voltage of the capacitor 13 connected in parallel to each semiconductor switching element Q increases to voltage of the second smoothing capacitor 7 or decreases to the vicinity of zero voltage, thereby performing zero voltage switching.

A phase shift amount θ3 (third phase shift amount) of the drive signal for the second diagonal element Q2B relative to a phase of the drive signal for the second reference element Q1A, and a phase shift amount θ4 (fourth phase shift amount) of the drive signal for the first diagonal element Q3B relative to a phase of the drive signal for the second reference element Q1A, are determined in accordance with a DUTY ratio which is a control command. That is, the phase shift amounts θ3 and θ4 are controlled in accordance with the DUTY ratio.

In step-down discharging shown in FIG. 26, the phase shift amount θ3 and the phase shift amount θ4 are equal to each other, and both phase shift amounts θ3 and θ4 vary in accordance with the DUTY ratio. In step-up discharging shown in FIG. 27, the phase shift amount θ3 is kept to be minimum, and the phase shift amount θ4 varies in accordance with the DUTY ratio.

As shown in FIG. 26 and FIG. 27, the diagonal ON time t3 during which Q1A and Q2B are simultaneously ON is determined depending on the phase shift amount θ3, and the diagonal ON time t3a during which Q1B and Q2A are simultaneously ON is also equal to the diagonal ON time t3.

In the control circuit 20, for the first bridge circuit (Q4A, Q4B), drive signals equal to the drive signal for the second bridge circuit (Q1A, Q1B) are assumed as virtual drive signals, and a period during which a virtual ON period of Q4A due to the virtual drive signal for Q4A and an ON period of Q3B overlap each other is defined as a virtual diagonal ON time t4. The virtual diagonal ON time t4 is determined depending on the phase shift amount θ4. A virtual diagonal ON time t4a during which a virtual ON period of Q4B due to the virtual drive signal for Q4B and an ON period of Q3A overlap each other is also equal to the virtual diagonal ON time t4.

Thus, the battery charge/discharge device 100 has four control modes of step-up charging, step-down charging, step-down discharging, and step-up discharging, to perform bidirectional power transmission. As described above, in charging in which power is transmitted from the DC power supply 1 to the battery 2, the phase shift amount θ1 of the drive signal for the first diagonal element Q3B and the phase shift amount θ2 of the drive signal for the second diagonal element Q2B relative to a phase of the drive signal for the first reference element Q4A are controlled in accordance with the DUTY ratio. In discharging in which power is transmitted from the DC power supply 1 to the battery 2, the phase shift amount θ3 of the drive signal for the second diagonal element Q2B and the phase shift amount θ4 of the drive signal for the first diagonal element Q3B relative to a phase of the drive signal for the second reference element Q1A are controlled in accordance with the DUTY ratio.

Figure 28:
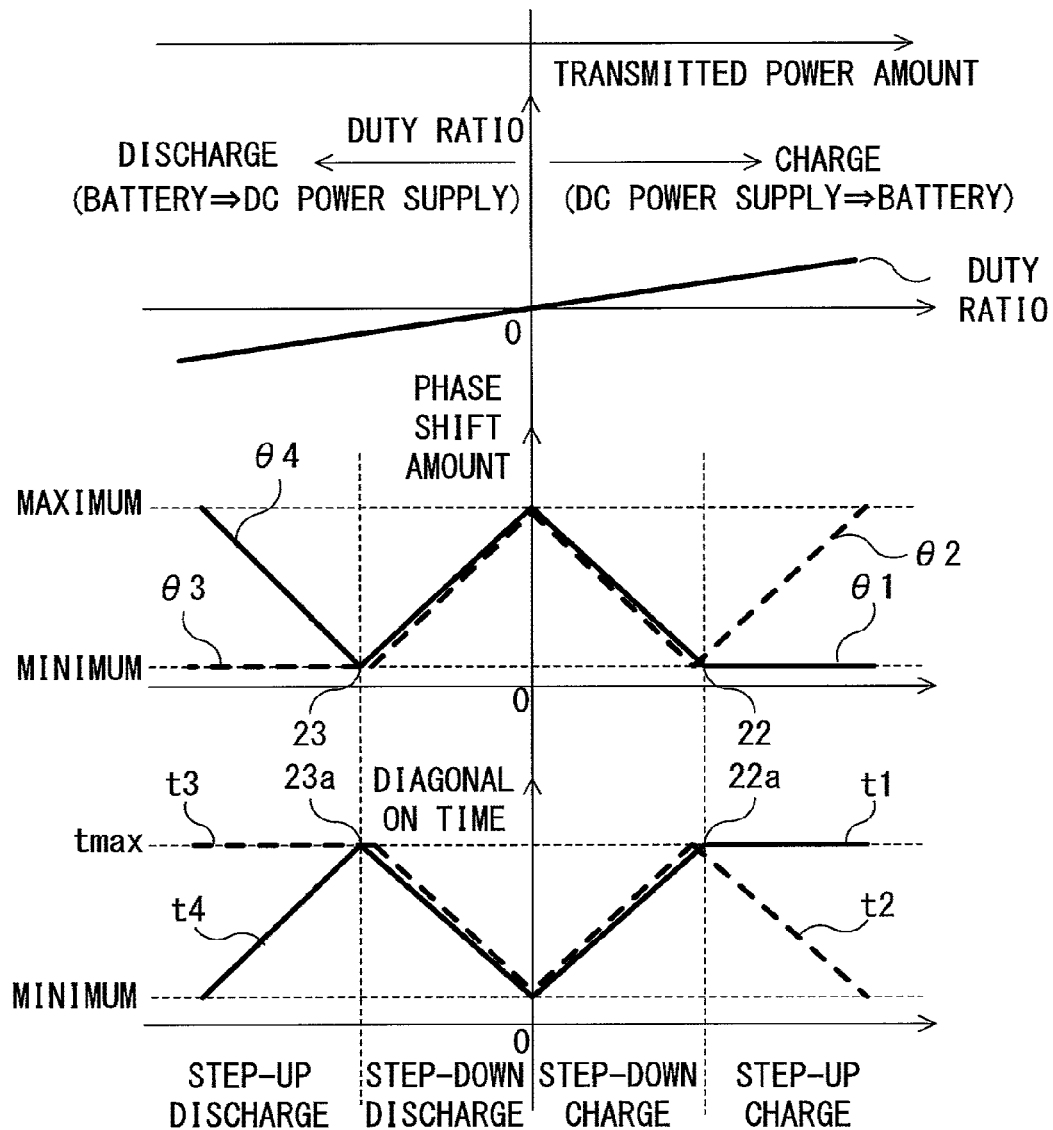
FIG. 28 is a waveform diagram for explaining control operation of the battery charge/discharge device according to embodiment 1 of the present invention.

FIG. 28 shows the phase shift amounts θ1 to θ4 in accordance with the DUTY ratio, and shows the diagonal ON times t1 and t3 and the virtual diagonal ON times t2 and t4. As shown in FIG. 28, the DUTY ratio is determined in accordance with a transmitted power amount. In this case, a power amount in a charging direction is assumed to be positive.

Since both the phase shift amount θ1 in charging and the phase shift amount θ4 in discharging are a phase shift amount of the first diagonal element Q3B, they are continuously drawn by the same solid line. Since both the phase shift amount θ2 in charging and the phase shift amount θ3 in discharging are a phase shift amount of the second diagonal element Q2B, they are continuously drawn by the same dotted line. Similarly, the diagonal ON time t1 and the virtual diagonal ON time t4 are continuously drawn by the same solid line, and the virtual diagonal ON time t2 and the diagonal ON time t3 are continuously drawn by the same dotted line.

First, control for the battery charge/discharge device 100 to charge the battery 2 from the DC power supply 1 will be described.

A period during which power is transmitted from the first winding 3a to the second winding 3b of the transformer 3 and voltage is generated on the second winding 3b is the diagonal ON time t1 during which Q4A and Q3B are simultaneously ON and the diagonal ON time t1a during which Q4B and Q3A are simultaneously ON.

In the case of step-up, if the above period is elongated as much as possible, loss relevant to the circulation periods of the first switching circuit 5 and the second switching circuit 8 can be reduced.

Therefore, in control for step-up charging, the control circuit 20 sets the diagonal ON time t1 (=t1a) to a maximum ON time tmax so that a period during which voltage is applied to the first winding 3a of the transformer 3 is maximized. The maximum ON time tmax is set based on the short-circuit prevention time needed for each semiconductor switching element Q of the first switching circuit 5 to perform zero voltage switching. In this case, the phase shift amount θ1 of the drive signal for Q3B relative to a phase of the drive signal for Q4A is minimum, and equal to the short-circuit prevention time.

In the step-up charging, the diagonal ON time (t1, t1a) during which voltage is applied to the transformer 3 includes a period during which the second reactor 10 is excited by the second switching circuit 8. That is, the phase shift amount θ2 of the drive signal for the second diagonal element Q2B relative to a phase of the drive signal for Q4A is equal to or greater than the phase shift amount θ1 and has a base point at a first reference point 22 at which both phase shift amounts θ1 and θ2 are minimum (short-circuit prevention time). When the DUTY ratio increases, the control circuit 20 increases the phase shift amount θ2 while keeping the phase shift amount θ1 to be minimum.

When the phase shift amounts θ1 and θ2 are at the first reference point 22 at which both of them are minimum (short-circuit prevention time), the diagonal ON time t1 and the virtual diagonal ON time t2 are at a point 22a at which both of them are the maximum ON time tmax. From the point 22a as a base point, when the DUTY ratio increases, the control circuit 20 reduces the virtual diagonal ON time t2 while keeping the diagonal ON time t1 to be the maximum ON time tmax.

In the case of step-down charging, the phase shift amount θ1 and the phase shift amount θ2 are equal to each other, and both phase shift amounts θ1 and θ2 vary in accordance with the DUTY ratio.

When the phase shift amounts θ1 and θ2 are maximum, both the diagonal ON time t1 and the virtual diagonal ON time t2 are minimum (short-circuit prevention time), and power transmission is not performed. In step-down charging, when the DUTY ratio is zero, the phase shift amounts θ1 and θ2 are maximum, and when the DUTY ratio increases, the control circuit 20 reduces both phase shift amounts θ1 and θ2. At this time, the diagonal ON time t1 and the virtual diagonal ON time t2 increase.

When both phase shift amounts θ1 and θ2 are maximum, the control circuit 20 switches from control in which the second bridge (Q1A, Q1B) in the second switching circuit 8 is kept in an OFF state, to control in which the first bridge (Q4A, Q4B) in the first switching circuit 5 is kept in an OFF state, thus switching the power transmission direction. In this switching, both the diagonal ON time t1 and the virtual diagonal ON time t2 are minimum (short-circuit prevention time), that is, power transmission is not performed. Therefore, the switching can be smoothly performed without causing influence by the switching.

In control for step-up discharging in which the battery 2 is discharged to transmit power to the DC power supply 1, the control circuit 20 sets the diagonal ON time t3 (=t3a) to the maximum ON time tmax so that a period during which voltage is applied to the second winding 3b of the transformer 3 is maximized. In this case, the phase shift amount θ3 of the drive signal for Q2B relative to a phase of the drive signal for Q1A becomes minimum (short-circuit prevention time). The phase shift amount θ4 of the drive signal for Q3B relative to a phase of the drive signal for Q1A is equal to or greater than the phase shift amount θ3. From a second reference point 23 as a base point, at which both phase shift amounts θ3 and θ4 are minimum (short-circuit prevention time), when discharge power increases and the DUTY ratio increases in a negative direction, the control circuit 20 increases the phase shift amount θ4 while keeping the phase shift amount θ3 to be minimum.

When the phase shift amounts θ3 and θ4 are at the second reference point 23 at which both of them are minimum (short-circuit prevention time), the diagonal ON time t3 and the virtual diagonal ON time t4 are at a point 23a at which both of them are the maximum ON time tmax. From the point 23a as a base point, when the DUTY ratio increases in a negative direction, the control circuit 20 reduces the virtual diagonal ON time t4 while keeping the diagonal ON time t3 to be the maximum ON time tmax.

In the case of step-down discharging, the phase shift amount θ3 and the phase shift amount θ4 are equal to each other, and both phase shift amounts θ3 and θ4 vary in accordance with the DUTY ratio.

When the phase shift amounts θ3 and θ4 are maximum, both the diagonal ON time t3 and the virtual diagonal ON time t4 are minimum (short-circuit prevention time), and power transmission is not performed. In step-down discharging, when the DUTY ratio is zero, the phase shift amounts θ3 and θ4 are maximum, and when the DUTY ratio increases in a negative direction, the control circuit 20 reduces both phase shift amounts θ3 and θ4. At this time, the diagonal ON time t3 and the virtual diagonal ON time t4 increase.

When both phase shift amounts θ3 and θ4 are maximum, the control circuit 20 switches from control in which the first bridge (Q4A, Q4B) in the first switching circuit 5 is kept in an OFF state, to control in which the second bridge (Q1A, Q1B) in the second switching circuit 8 is kept in an OFF state, thus switching the power transmission direction. In this switching, power transmission is not performed. Therefore, the switching can be smoothly performed without causing influence by the switching.

Thus, in the battery charge/discharge device 100, the control circuit 20 controls the phase shift amounts θ1 to θ4 in accordance with the DUTY ratio, whereby bidirectional power conversion can be performed without depending on the power transmission direction and without depending on voltages of the DC power supply 1 and the battery 2. Thus, the battery charge/discharge device 100 can realize bidirectional power conversion operation through simple control.

Figure 29:
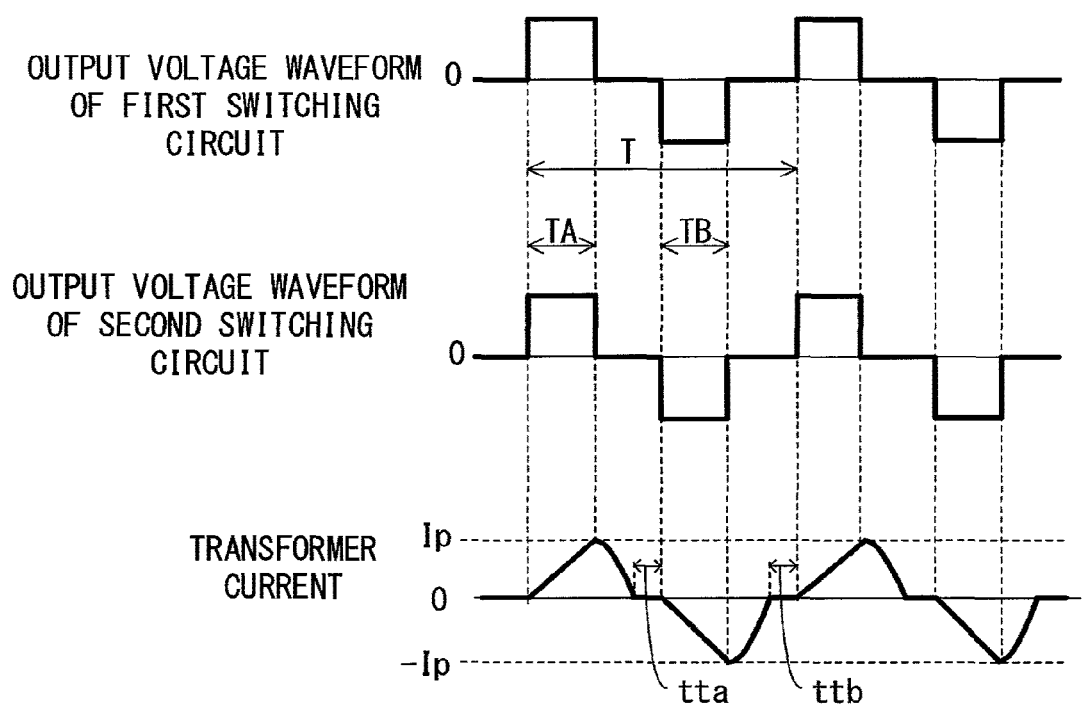
FIG. 29 is a waveform diagram showing voltage and current of a transformer according to embodiment 1 of the present invention.

Next, voltage and current of the transformer 3 will be described based on FIG. 29.

In power transmission from the DC power supply 1 to the battery 2, the first switching circuit 5 outputs a positive voltage pulse during the diagonal ON time t1 (TA) during which Q4A and Q3B are simultaneously ON, and a negative voltage pulse during the diagonal ON time t1a (TB) during which Q4B and Q3A are simultaneously ON, to apply these pulses to the first winding 3a of the transformer 3. These periods serve as the power transmission periods TA and TB, and voltage is generated on the second winding 3b in accordance with the turns ratio of the transformer 3. A waveform of output voltage of the first switching circuit 5 is a waveform of voltage applied to the first winding 3a, and if the magnitude thereof is neglected, is the same as a waveform of voltage generated on the second winding 3b, i.e., a waveform of output voltage of the second switching circuit 8.

The magnitude of current flowing through the transformer 3 increases during the power transmission periods TA and TB, and thereafter, decreases. As described above, when the battery 2 is charged, Q1A and Q1B of the second bridge circuit (Q1A, Q1B) are kept in OFF states. Therefore, when circulation current flowing through the transformer 3 decreases to 0[A], the diode of Q1A or Q1B becomes OFF, and current flowing through the transformer 3 is maintained at 0[A] during periods tta and ttb. Thus, reverse current is prevented from flowing through the transformer 3, so that reactive power can be suppressed and loss can be reduced.

The same applies to power transmission from the battery 2 to the DC power supply 1.

Figure 30:
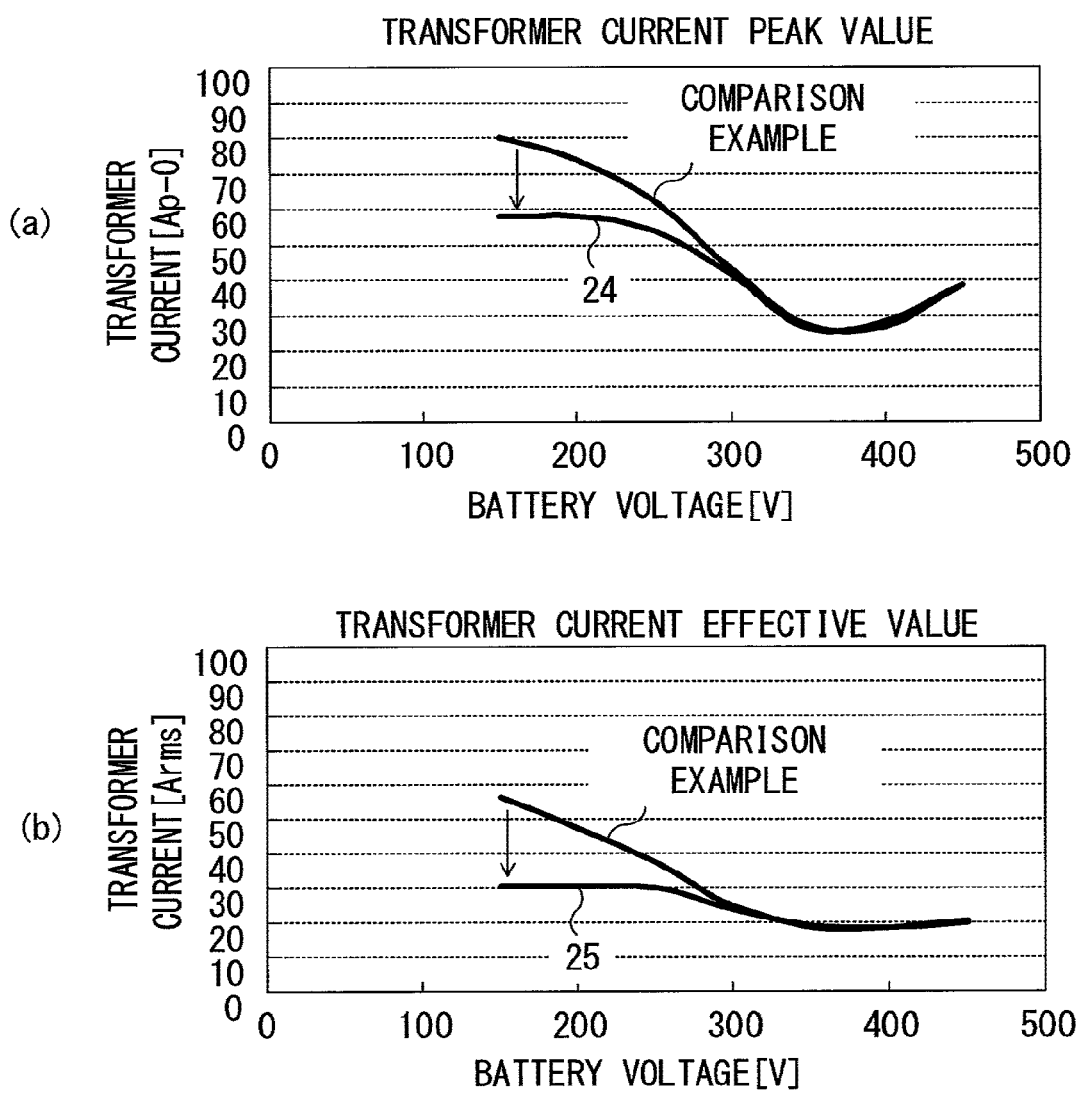
FIG. 30 is a waveform diagram showing current of the transformer according to embodiment 1 of the present invention.

Thus, by preventing reverse current from flowing through the transformer 3, a peak value and an effective value of transformer current can be reduced. FIG. 30 shows the transformer current. Particularly, FIG. 30(a) shows a peak value of the transformer current, and FIG. 30(b) shows an effective value of the transformer current.

The case of using the virtual drive signal as an actual drive signal, i.e., the case where reverse current can flow through the transformer 3 is shown as a comparison example. For example, when the battery voltage is 150V, a transformer current peak value 24 reduces from 80 Ap (comparison example) to 58 Ap. A transformer current effective value 25 reduces from 55 Arms (comparison example) to 30 Arms.

Figure 31:
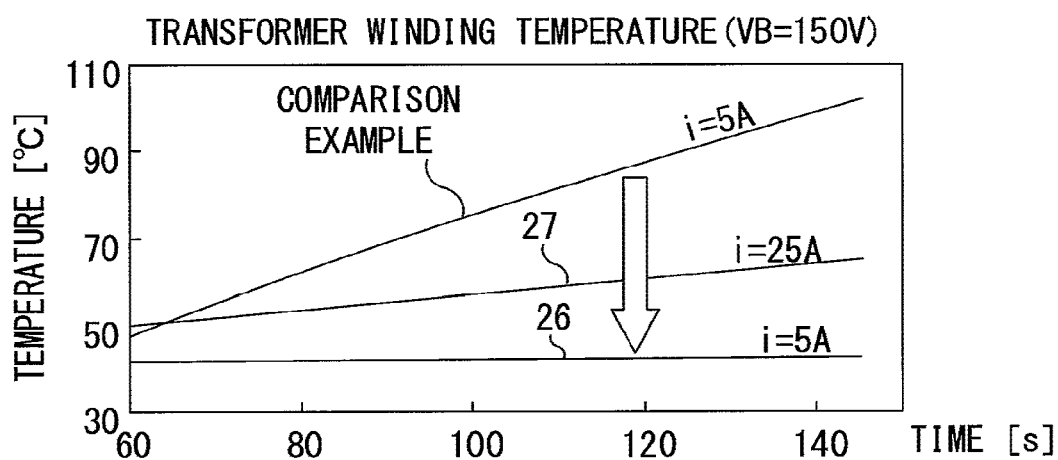
FIG. 31 is a waveform diagram showing a winding temperature of the transformer according to embodiment 1 of the present invention.

FIG. 31 shows a transformer winding temperature 26 in the case of a current value 5A, which is the same current value as in the comparison example, and shows a transformer winding temperature 27 in the case of a higher current value 25A. As shown in FIG. 31, the transformer winding temperature can also be greatly reduced.

Thus, in the transformer 3, the peak value and the effective value of the transformer current can be reduced, and the transformer winding temperature can also be greatly reduced, whereby transformer winding loss can be greatly reduced and downsizing of the transformer 3 can be promoted.

Figure 32:
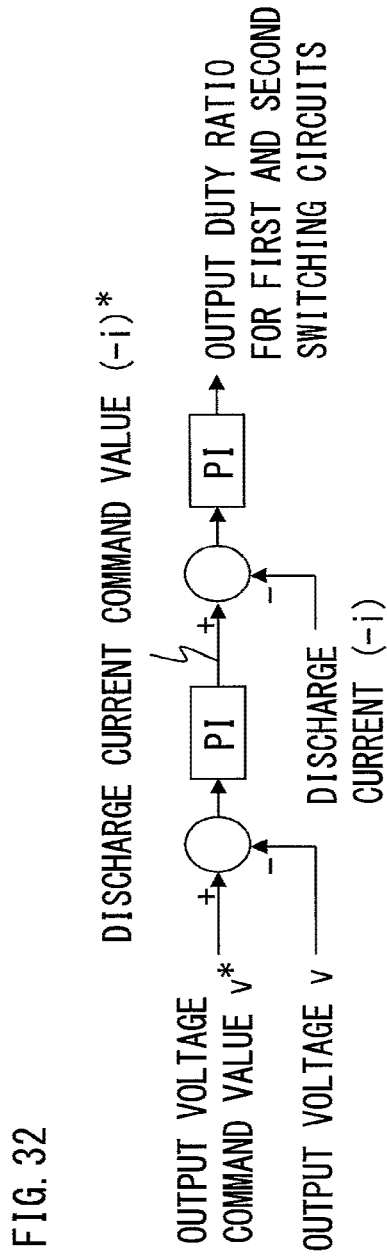
FIG. 32 is a control block diagram showing another example when the battery charge/discharge device is discharged, according to embodiment 1 of the present invention.

In the above embodiment, when the battery charge/discharge device 100 transmits power from the battery 2 to the DC power supply 1, the control circuit 20 performs feedback control so that the output voltage v to the DC power supply 1 follows the output voltage command value v*. However, the following control may be performed. As shown in FIG. 32, the control circuit 20 feeds back a difference between the output voltage command value v* and the output voltage v, to generate a discharge current command value (−i)* for the battery 2. Then, the control circuit 20 determines an output DUTY ratio for the first and second switching circuits 5 and 8 through feedback control so that discharge current (−i) obtained by inverting the sign of the detected charge current i coincides with the discharge current command value (−i)*.

Thus, the control circuit 20 can realize bidirectional control, based on only charge/discharge current ±i flowing between the DC power supply 1 and the battery 2.

Figure 33:
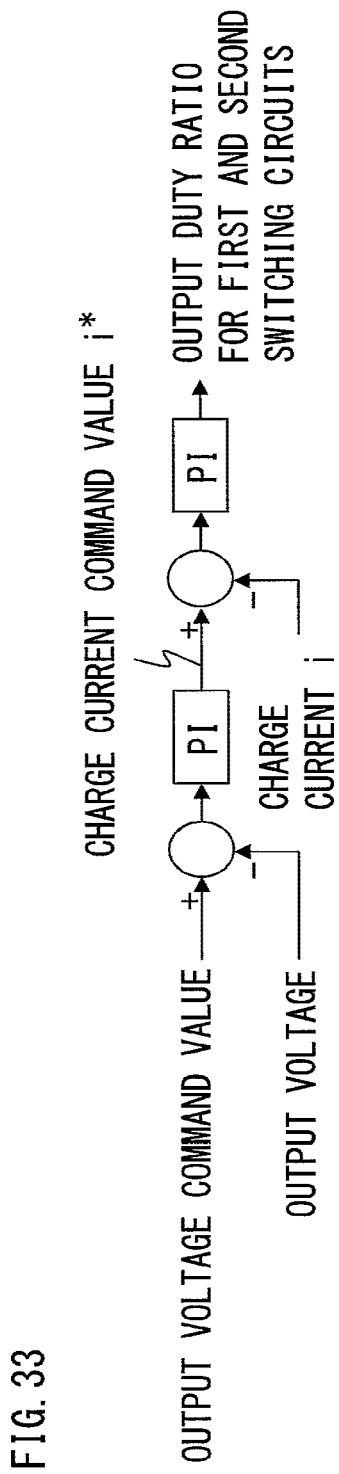
FIG. 33 is a control block diagram showing another example when the battery charge/discharge device is charged, according to embodiment 1 of the present invention.

The control circuit 20 may perform the control for transmitting power from the DC power supply 1 to the battery 2, by means of voltage control for the battery 2, as shown in FIG. 33. As shown in FIG. 33, the control circuit 20 feeds back a difference between an output voltage command value for the battery 2 and output voltage thereto, to generate a charge current command value i* for the battery 2, thus performing control. Thus, the control circuit 20 has a function of performing voltage control for both the DC power supply 1 and the battery 2, and the battery charge/discharge device 100 can continue operation through consistent control irrespective of the power transmission direction.

In the above embodiment, it has been described that power is transmitted in both cases of step-down charging and step-down discharging. However, for example, if voltage of the battery 2 is higher than voltage generated on the second winding 3b, a transmitted power amount is zero under the gate pattern in step-down charging shown in FIG. 14. In this case, since the second bridge circuit (Q1A, Q1B) blocks current, power transmission is not performed. If voltage of the DC power supply 1 is higher than voltage generated on the first winding 3a, a transmitted power amount is zero under the gate pattern in step-down discharging shown in FIG. 26. In this case, since the first bridge circuit (Q4A, Q4B) blocks current, power transmission is not performed.

In the above embodiment, the first and second reactors 9 and 10 are each separately provided. However, the same effect can be obtained even by using leakage inductance of the transformer 3 as at least one of the first and second reactors 9 and 10. Thus, components of the battery charge/discharge device 100 can be decreased, and bidirectional operation can be realized with a simple configuration.

In the above embodiment, the battery 2 is used as one (second DC power supply) of the DC power supplies, but the present invention is not limited thereto. Both of the first and second DC power supplies may be batteries.

Embodiment 2

Control at the time of starting the battery charge/discharge device 100 shown in the above embodiment 1 will be described.

For example, in the case where the battery charge/discharge device 100 transmits power from the DC power supply 1 to the battery 2, when the DUTY ratio is zero, the phase shift amounts θ1 and θ2 are maximum, and when the DUTY ratio increases, both phase shift amounts θ1 and θ2 reduce by an equal amount (see FIG. 28).

At the time of starting the battery charge/discharge device 100, the control circuit 20 gradually reduces the phase shift amounts θ1 and θ2 from maximum while equalizing them, thereby gradually increasing the diagonal ON times t1 and t1a, thus softly starting the battery charge/discharge device 100. A peak value of current flowing in the winding of the transformer 3 is proportional to voltage applied to the winding of the transformer 3 and time of the application. Therefore, if the battery charge/discharge device 100 is softly started as described above at the time of starting, a peak value of current flowing in the winding of the transformer 3 can be gradually varied, whereby load on an externally connected device can be reduced.

The same applies to the case where the battery charge/discharge device 100 transmits power from the battery 2 to the DC power supply 1. That is, at the time of starting, the control circuit 20 gradually reduces the phase shift amounts θ3 and θ4 while equalizing them, thereby softly starting the battery charge/discharge device 100.

Embodiment 3

In the battery charge/discharge device 100 according to the above embodiment 1, the maximum value of the phase shift amount is equal between the step-up case and the step-down case. However, the maximum value in the step-up case may be set to be lower.

Figure 34:
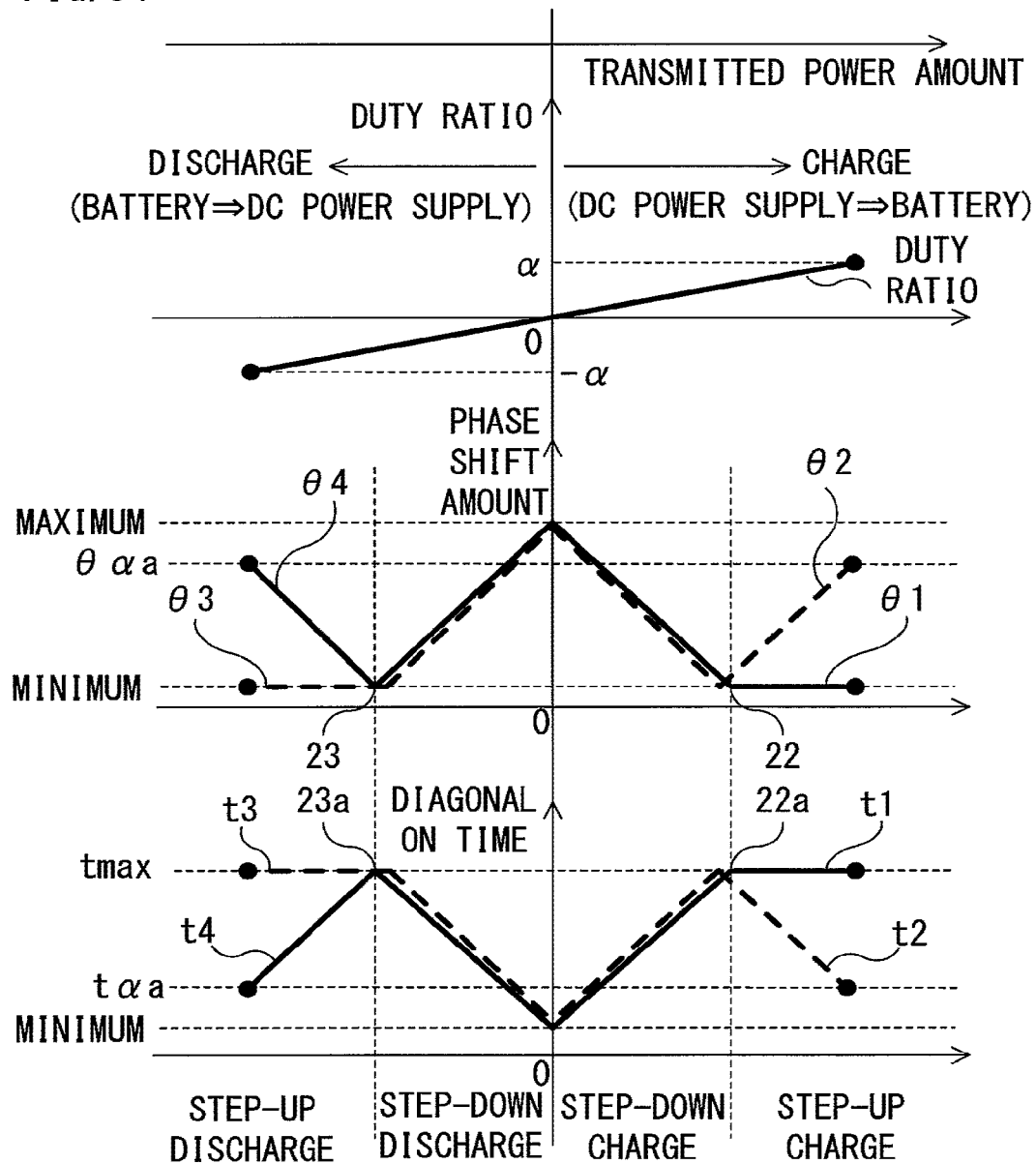
FIG. 34 is a waveform diagram for explaining control operation of a battery charge/discharge device according to embodiment 3 of the present invention.

In this embodiment 3, the control circuit 20 is provided with a limiter to limit the DUTY ratio to be generated, by a limitation value α. As shown in FIG. 34, the magnitude of the DUTY ratio is limited by the limitation value α, so that the maximum values of the phase shift amounts θ2 and θ4 in the step-up case become a set maximum amount θαa which is lower than a maximum value determined based on the short-circuit prevention time. The minimum values of the virtual diagonal ON times t2 and t4 in the step-up case become a time tαa which is longer than the short-circuit prevention time.

Thus, the degree of freedom in control design of the battery charge/discharge device 100 increases.

Embodiment 4

In the above embodiment 3, the control circuit 20 limits the magnitude of the DUTY ratio by the limitation value α, and reduces the maximum values of the phase shift amounts θ2 and θ4 in the step-up case. However, the minimum values of the phase shift amounts θ1, θ2, θ3, and θ4 in the step-down case may be increased.

As shown in FIG. 35, the magnitude of the DUTY ratio is limited by the limitation value α, so that the minimum values of θ1, θ2, θ3, and θ4 in the step-down case become a set minimum amount θαb which is greater than the short-circuit prevention time. In this case, the maximum values of the diagonal ON times t1 and t3 and the virtual diagonal ON times t2 and t4 in the step-down case become a time tαb which is shorter than the maximum ON time tmax determined based on the short-circuit prevention time.

In the above embodiment 3, if the limitation value α for the DUTY ratio is zero, the diagonal ON times t1 and t3 and the virtual diagonal ON times t2 and t4 become zero. In this case, the battery charge/discharge device 100 can make transmitted power be zero while continuing switching of each semiconductor switching element Q.

By increasing the limitation value α for the DUTY ratio from zero, the control circuit 20 can increase transmitted power in the battery charge/discharge device 100 from zero. Thus, by the control circuit 20 changing the limitation value α for the DUTY ratio, the battery charge/discharge device 100 can repeat stop and restart of bidirectional power transmission without stopping switching of each semiconductor switching element Q.

Thus, operation to start and stop the battery charge/discharge device 100 can be partially omitted, whereby quick response of control is improved.

It is noted that, within the scope of the present invention, the above embodiments may be freely combined with each other, or each of the above embodiments may be modified or abbreviated as appropriate.

The invention claimed is:

1. A DC-DC converter which performs bidirectional power transmission between a first DC power supply and a second DC power supply, the DC-DC converter comprising:
   a transformer;
   a first converter unit composed of a full-bridge circuit having two bridge circuits each having a plurality of semiconductor switching elements to each of which an antiparallel diode and a parallel capacitor are connected, the first converter unit being connected between the first DC power supply and a first winding of the transformer, and performing bidirectional power conversion between DC and AC;
   a second converter unit composed of a full-bridge circuit having two bridge circuits each having a plurality of semiconductor switching elements to each of which an antiparallel diode and a parallel capacitor are connected, the second converter unit being connected between the second DC power supply and a second winding of the transformer, and performing bidirectional power conversion between DC and AC;
   a first reactor and a second reactor connected on respective AC input/output lines of the first converter unit and the second converter unit; and
   a control circuit for drive-controlling each semiconductor switching element in the first converter unit and the second converter unit, thereby controlling the first converter unit and the second converter unit, wherein
   in first power transmission from the first DC power supply to the second DC: power supply, the control circuit
      turns off all the semiconductor switching elements of a second bridge circuit which is one of the bridge circuits of the second converter unit,
      controls each semiconductor switching element in the first converter unit so as to perform zero voltage switching, using the first reactor, and
      when voltage of the second DC power supply is higher than voltage generated on the second winding of the transformer, controls the second converter unit so as to perform step-up operation, using the second reactor, and
   in second power transmission from the second DC power supply to the first DC power supply, the control circuit
      turns off all the semiconductor switching elements of a first bridge circuit which is one of the bridge circuits of the first converter unit,
      controls each semiconductor switching element in the second converter unit so as to perform zero voltage switching, using the second reactor, and
      when voltage of the first DC power supply is higher than voltage generated on the first winding of the transformer, controls the first converter unit so as to perform step-up operation, using the first reactor.

2. The DC-DC converter according to claim 1, wherein
   in the first power transmission, the control circuit controls semiconductor switching elements on a positive side and semiconductor switching elements on a negative side in three bridge circuits other than the second bridge circuit in the first converter unit and the second converter unit, with an ON time ratio of 50%, respectively, excluding a short-circuit prevention time, and
   in the second power transmission, the control circuit controls semiconductor switching elements on a positive side and semiconductor switching elements on a negative side in three bridge circuits other than the first bridge circuit in the first converter unit and the second converter unit, with an ON time ratio of 50%, respectively, excluding a short-circuit prevention time.

3. The DC-DC converter according to claim 2, wherein
   a semiconductor switching element on one of a positive side and a negative side in the first bridge circuit in the first converter unit is defined as a first reference element,
   a semiconductor switching element on one of a positive side and a negative side in the second bridge circuit in the second converter unit is defined as a second reference element,
   in the first converter unit, a semiconductor switching element diagonal to the first reference element is defined as a first diagonal element,
   in the second converter unit, a semiconductor switching element diagonal to the second reference element is defined as a second diagonal element,
   in the first power transmission, the control circuit controls a first phase shift amount of a drive signal for the first diagonal element and a second phase shift amount of a drive signal for the second diagonal element relative to a phase of a drive signal for the first reference element, and
   in the second power transmission, the control circuit controls a third phase shift amount of a drive signal for the second diagonal element and a fourth phase shift amount of a drive signal for the first diagonal element relative to a phase of a drive signal for the second reference element.

4. The DC-DC converter according to claim 3, wherein
in the first power transmission,
the control circuit controls the first phase shift amount and the second phase shift amount by the same amount, and when increasing a power transmission amount from the first DC power supply to the second DC power supply, reduces the first phase shift amount and the second phase shift amount,
in the second power transmission,
the control circuit controls the third phase shift amount and the fourth phase shift amount by the same amount, and when increasing a power transmission amount from the second DC power supply to the first DC power supply, reduces the third phase shift amount and the fourth phase shift amount, and
the control circuit switches between the first power transmission and the second power transmission, when the first phase shift amount and the second phase shift amount are maximum in the first power transmission, and when the third phase shift amount and the fourth phase shift amount are maximum in the second power transmission.

5. The DC-DC converter according to claim 4, wherein
in the first power transmission, using as a first reference point a point at which both the first phase shift amount and the second phase shift amount are minimum, when increasing a power transmission amount from the first DC power supply to the second DC power supply from the first reference point, the control circuit increases the second phase shift amount while keeping the first phase shift amount to be minimum, and
in the second power transmission, using as a second reference point a point at which both the third phase shift amount and the fourth phase shift amount are minimum, when increasing a power transmission amount from the second DC power supply to the first DC power supply from the second reference point, the control circuit increases the fourth phase shift amount while keeping the third phase shift amount to be minimum.

6. The DC-DC converter according to claim 5, wherein the control circuit limits, by a set maximum amount, the second phase shift amount when a power transmission amount from the first DC power supply to the second DC power supply increases from the first reference point, and the fourth phase shift amount when a power transmission amount from the second DC power supply to the first DC power supply increases from the second reference point.

7. The DC-DC converter according to claim 4, wherein the control circuit limits the first to fourth phase shift amounts by a set minimum amount, when controlling the first phase shift amount and the second phase shift amount by the same amount in the first power transmission, and when controlling the third phase shift amount and the fourth phase shift amount by the same amount in the second power transmission.

8. The DC-DC converter according to claim 7, wherein the set minimum amount is variable.

9. The DC-DC converter according to claim 4, wherein the control circuit calculates an output DUTY ratio based on a power transmission amount between the first DC power supply and the second DC power supply, determines a power transmission direction based on a polarity of the output DUTY ratio, and determines the first to fourth phase shift amounts based on a magnitude of the output DUTY ratio.

10. The DC-DC converter according to claim 4, wherein
in the first power transmission, while assuming, for the second reference element, a virtual drive signal equal to a drive signal for the first reference element, the control circuit controls the second phase shift amount, to control a virtual diagonal ON time during which a virtual ON period of the second reference element and an ON period of the second diagonal element overlap each other, and controls the first phase shift amount, to control a diagonal ON time during which both the first reference element and the first diagonal element are ON, and
in the second power transmission, while assuming, for the first reference element, a virtual drive signal equal to a drive signal for the second reference element, the control circuit controls the fourth phase shift amount, to control a virtual diagonal ON time during which a virtual ON period of the first reference element and an ON period of the first diagonal element overlap each other, and controls the third phase shift amount, to control a diagonal ON time during which both the second reference element and the second diagonal element are ON.

11. The DC-DC converter according to claim 4, wherein the first reference element of the first converter unit and the second reference element of the second converter unit are located symmetrically with respect to the transformer.

12. The DC-DC converter according to claim 3, wherein
in the first power transmission, using as a first reference point a point at which both the first phase shift amount and the second phase shift amount are minimum, when increasing a power transmission amount from the first DC power supply to the second DC power supply from the first reference point, the control circuit increases the second phase shift amount while keeping the first phase shift amount to be minimum, and
in the second power transmission, using as a second reference point a point at which both the third phase shift amount and the fourth phase shift amount are minimum, when increasing a power transmission amount from the second DC power supply to the first DC power supply from the second reference point, the control circuit increases the fourth phase shift amount while keeping the third phase shift amount to be minimum.

13. The DC-DC converter according to claim 12, wherein the control circuit limits, by a set maximum amount, the second phase shift amount when a power transmission amount from the first DC power supply to the second DC power supply increases from the first reference point, and the fourth phase shift amount when a power transmission amount from the second DC power supply to the first DC power supply increases from the second reference point.

14. The DC-DC converter according to claim 13, wherein the set maximum amount is variable.

15. The DC-DC converter according to claim 3, wherein the control circuit calculates an output DUTY ratio based on a power transmission amount between the first DC power supply and the second DC power supply, determines a power transmission direction based on a polarity of the output DUTY ratio, and determines the first to fourth phase shift amounts based on a magnitude of the output DUTY ratio.

16. The DC-DC converter according to claim 3, wherein
in the first power transmission, while assuming, for the second reference element, a virtual drive signal equal to a drive signal for the first reference element, the control circuit controls the second phase shift amount, to control a virtual diagonal ON time during which a virtual ON period of the second reference element and an ON period of the second diagonal element overlap each other, and controls the first phase shift amount, to control a diagonal ON time during which both the first reference element and the first diagonal element are ON, and in the second power transmission, while assuming, for the first reference element, a virtual drive signal equal to a drive signal for the second reference element, the control circuit controls the fourth phase shift amount, to control a virtual diagonal ON time during which a virtual ON period of the first reference element and an ON period of the first diagonal element overlap each other, and controls the third phase shift amount, to control a diagonal ON time during which both the second reference element and the second diagonal element are ON.

17. The DC-DC converter according to claim 3, wherein the first reference element of the first converter unit and the second reference element of the second converter unit are located symmetrically with respect to the transformer.

* * * * *